(12) United States Patent
Miller et al.

(10) Patent No.: US 9,718,032 B2
(45) Date of Patent: *Aug. 1, 2017

(54) UNCROSSLINKED, HIGH MOLECULAR WEIGHT, MONOESTERIFIED POLYIMIDE POLYMER CONTAINING A SMALL AMOUNT OF BULKY DIAMINE

(71) Applicants: Chevron U.S.A. Inc., San Ramon, CA (US); Georgia Tech Research Corporation, Atlanta, GA (US)

(72) Inventors: Stephen Joseph Miller, San Francisco, CA (US); William John Koros, Atlanta, GA (US); Nanwen Li, Atlanta, GA (US); Gongping Liu, Atlanta, GA (US)

(73) Assignees: Chevron U.S.A. Inc., San Ramon, CA (US); Georgia Tech Research Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/093,519

(22) Filed: Apr. 7, 2016

(65) Prior Publication Data

US 2016/0214066 A1 Jul. 28, 2016

Related U.S. Application Data

(63) Continuation-in-part of application No. 14/757,447, filed on Dec. 23, 2015.

(60) Provisional application No. 62/096,350, filed on Dec. 23, 2014.

(51) Int. Cl.
| | | |
|---|---|---|
| B01D 71/64 | (2006.01) | |
| C08G 73/10 | (2006.01) | |
| B01D 53/22 | (2006.01) | |
| B01D 67/00 | (2006.01) | |
| B01D 69/08 | (2006.01) | |
| B01D 71/82 | (2006.01) | |
| B01D 69/02 | (2006.01) | |
| C08L 79/08 | (2006.01) | |

(52) U.S. Cl.
CPC .......... *B01D 71/64* (2013.01); *B01D 53/228* (2013.01); *B01D 67/0006* (2013.01); *B01D 67/0088* (2013.01); *B01D 69/02* (2013.01); *B01D 69/085* (2013.01); *B01D 69/087* (2013.01); *B01D 71/82* (2013.01); *C08G 73/101* (2013.01); *C08G 73/1028* (2013.01); *C08G 73/1039* (2013.01); *C08G 73/1042* (2013.01); *C08G 73/1067* (2013.01); *C08L 79/08* (2013.01); *B01D 2256/245* (2013.01); *B01D 2257/504* (2013.01); *B01D 2323/30* (2013.01); *B01D 2323/36* (2013.01); *B01D 2325/20* (2013.01); *Y02C 10/10* (2013.01); *Y02P 20/152* (2015.11)

(58) Field of Classification Search
None
See application file for complete search history.

(56) References Cited

U.S. PATENT DOCUMENTS

| | | | |
|---|---|---|---|
| 6,755,900 B2 | 6/2004 | Koros et al. | |
| 6,932,859 B2 | 8/2005 | Koros et al. | |
| 7,247,191 B2 | 7/2007 | Koros et al. | |
| 7,981,974 B2 | 7/2011 | Miller et al. | |
| 8,066,799 B2 | 11/2011 | Miller et al. | |
| 8,328,906 B2 | 12/2012 | Miller et al. | |
| 8,337,598 B2 | 12/2012 | Yates et al. | |
| 8,394,182 B2 | 3/2013 | Koros et al. | |
| 2009/0182097 A1* | 7/2009 | Miller | B01D 67/0006 525/420 |
| 2012/0297984 A1* | 11/2012 | Chung | B01D 53/228 96/10 |
| 2013/0220119 A1 | 8/2013 | Koros et al. | |

OTHER PUBLICATIONS

P. Dauger-Osguthorpe, V.A. Roberts, D.J. Osguthorpe, J. Wolff, M. Genest and A.T. Hagler, Structure and energetics of ligand binding to proteins: E. colidihydrofolate reductase-trimethoprim, a drug-receptor system. Proteins: Struct., Funct., Genet. 4, 31-47 (1988).
W. J. Koros and G. K. Fleming "Membrane-based gas separation", Journal of Membrane Science, 1993, vol. 83, pp. 1-80.
Ekiner O.M. et al., "Polyaramide Hollow Fibers for Hydrogen/Methane Separation—Spinning and Properties", Journal of Membrane Science 53 (1990) 259-273.
Prasad et al., "Evolution of membranes in commercial air separation", J. Membrane Sci., 94, 225-248 (1994).
C.L. Rohn, Analytical Polymer Rheology, Hanser-Gardener, New York (1995). J. Heijboer, Intl. J. Polym. Mater., 6, 11 (1977).
R. F. Boyer, "Dependence of Mechanical Properties on Molecular Motion in Polymers", Polym. Eng. Sci., 8 (3), 161 (1968).

(Continued)

*Primary Examiner* — Ana Woodward
(74) *Attorney, Agent, or Firm* — Melissa M. Hayworth; E. Joseph Gess; Mary R. Bram

(57) ABSTRACT

One method as described herein relates to making a membrane comprising an uncrosslinked high molecular weight, monoesterified polyimide polymer with a small amount of bulky diamine. These uncrosslinked high molecular weight, monoesterified polyimide polymers with a small amount of bulky diamine are useful in forming polymer membranes with high permeance and good selectivity that are useful for the separation of fluid mixtures. Also as described herein is a hollow fiber polymer membrane comprising an uncrosslinked high molecular weight, monoesterified polyimide polymer with a small amount of bulky diamine. The small amount of bulky diamine allows for formation of a membrane comprising the uncrosslinked polymer that exhibits high permeance and good selectivity.

33 Claims, 5 Drawing Sheets

(56) References Cited

OTHER PUBLICATIONS

International Search Report for corresponding Application No. PCT/US2015/000288 mailed Mar. 17, 2016.
International Search Report for corresponding Application No. PCT/US2016/026949 mailed Aug. 18, 2016.

* cited by examiner

UNCROSSLINKED, HIGH MOLECULAR WEIGHT, MONOESTERIFIED POLYIMIDE POLYMER CONTAINING A SMALL AMOUNT OF BULKY DIAMINE

RELATED APPLICATIONS

This application is a Continuation in Part of U.S. patent application Ser. No. 14/757,447 filed Dec. 23, 2015, which claims priority to U.S. Provisional No. 62/096,350 filed Dec. 23, 2014, both entitled "High Molecular Weight, Monoesterified Polyimide Polymer Containing a Small Amount of Bulky Diamine", the contents of both of which are incorporated herein by reference in their entireties. This application is also related to co-pending U.S. application Ser. No. 15/093,549 filed Apr. 7, 2016 entitled "Uncrosslinked, High Molecular Weight Polyimide Polymer Containing a Small Amount of Bulky Diamine", the contents of which are incorporated herein by reference in its entirety.

FIELD OF ART

Described herein is an uncrosslinked, high molecular weight, monoesterified polyimide polymer containing a small amount of bulky diamine. Also described herein is a method for making an uncrosslinked, high molecular weight, monoesterified polyimide polymer using a small amount of bulky diamine. These uncrosslinked, high molecular weight, monoesterified polyimide polymers are useful for polymer membranes with high permeance and good selectivity, which can be used for the separation of fluid mixtures.

BACKGROUND

Polymeric membranes for separating mixtures of gases, such as methane and carbon dioxide are known. For example, U.S. Pat. Nos. 7,247,191; 6,932,859; 6,755,900; 7,981,974; 8,066,799; 8,337,598; 8,394,182; and 8,328,906, which documents are incorporated by reference herein in their entireties, teach crosslinkable polymers and crosslinked hollow fiber membranes made from such crosslinkable polymers. These patents particularly describe a crosslinkable polyimide polymer. The crosslinkable polyimide polymer can be made by monoesterifying a polyimide polymer with a crosslinking agent.

A crosslinked hollow fiber membrane can be made by forming fibers from the crosslinkable polyimide polymer and transesterifying the crosslinkable polyimide polymer within the fibers. More specifically, the crosslinkable polyimide polymer can be formed into crosslinkable fibers, which are then subjected to transesterification conditions to create covalent ester crosslinks between the crosslinkable polyimide polymer within the fibers. Crosslinked hollow fiber membranes can be incorporated into a separation module. Other types of membranes for separation include flat sheet separation membranes or flat stack permeators.

Separation modules utilizing hollow fiber membranes include a larger surface area than separation modules utilizing flat sheet or flat stack permeators. Therefore, hollow fiber separation modules have significant separation capability even in a reasonably compact size module. Module size is important in implementing separation modules on offshore platforms, where space and weight are at a premium, to separate mixtures of gases from hydrocarbon producing wells.

The crosslinked hollow fiber membranes have good selectivity; however, the transesterification conditions to create covalent ester crosslinks between the crosslinkable polyimide polymer within the fibers causes a huge drop in permeance. The permeance loss can be, for example, about 50% or even as high as around 70% or higher. Crosslinking is also a difficult step to perform on commercial scale.

Therefore, there remains a need for a method of making a high molecular weight, monoesterified polyimide polymer which retains its selectivity and permeability. The monoesterified polymer also needs to have good strength, flexibility, and/or spinnability. Further there is a need for making separation membranes having improved permeance and selectivity.

SUMMARY

As described herein is a hollow fiber polymer membrane comprising a polyimide polymer membrane material made from a polyimide polymer having an average molecular weight of at least 50,000 and including the monomers A+B+C; wherein:

A is a dianhydride of the formula;

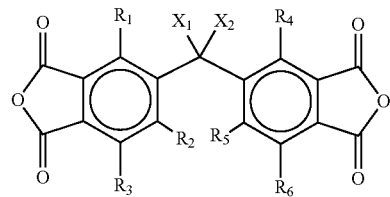

where $X_1$ and $X_2$ are the same or different halogenated alkyl group, phenyl or halogen;
where $R_1$, $R_2$, $R_3$, $R_4$, $R_5$, and $R_6$ are H, alkyl, or halogen;
B is a diamino cyclic compound without a carboxylic acid functionality;
C is a diamino cyclic compound with a carboxylic acid functionality; and wherein 2 to 10 mole % of the diamino monomers B and C are bulky diamino compounds D; and wherein the polyimide polymer membrane material comprises less than 30% by weight ester crosslinks.

One method as described herein relates to making an uncrosslinked, high molecular weight, monoesterified polyimide polymer using a small amount of bulky diamine. These uncrosslinked high molecular weight, monoesterified polyimide polymers are useful in polymer membranes with high permeance and good selectivity that are useful for the separation of fluid mixtures. Another method as described herein relates to making the membranes from the uncrosslinked high molecular weight, monoesterified polyimide polymer containing a small amount of bulky diamine. Yet another method as described herein relates to using the membranes to separate at least one component, such as $CO_2$, from a feed stream including more than one component, including for example $CO_2$ and $CH_4$.

The present disclosure relates to a method of making a membrane comprising an uncrosslinked high molecular weight, monoesterified polyimide polymer. The method comprises (a) preparing a polyimide polymer comprising carboxylic acid functional groups from a reaction solution comprising monomers and at least one solvent, wherein the monomers comprise dianhydride monomers, diamino monomers without carboxylic acid functional groups, and diamino monomers with carboxylic acid functional groups and wherein 2 to 10 mole % of the diamino monomers are bulky diamino compounds; (b) treating the polyimide polymer with a diol at esterification conditions in the presence of dehydrating conditions to form an uncrosslinked monoesterified polyimide polymer, wherein the dehydrating conditions at least partially remove water produced during step (b); and (c) obtaining a membrane comprising the uncrosslinked monoesterified polyimide polymer comprising less than 30% by weight ester crosslinks.

In step (a), the monomers polymerize in a polymerization reaction to provide a polyamide polymer comprising amide bonds. An imidization reaction takes place whereby the amide bonds form imide bonds to provide a polyimide polymer. The monomers comprise dianhydride monomers, diamino monomers without carboxylic acid functional groups, and diamino monomers with carboxylic acid functional groups. Of the diamino monomers, 2 to 10 mole % are bulky diamino compounds. In certain embodiments, 2 to 5 mole % are bulky diamino compounds.

In step (b), the polyimide polymer is monoesterified to provide the monoesterified polyimide polymer. The dehydrating conditions of step (b) can reduce, substantially eliminate, or completely eliminate loss in average molecular weight associated with monoesterification or even increase the average molecular weight of the monoesterified polyimide polymer relative to the polyimide polymer.

Step (b) can further comprise treating the polyimide polymer with the diol in the presence of an acid catalyst to facilitate the monoesterification reaction. When the acid catalyst is present in an amount less than that typically used in conventional monoesterification reactions without water removal, the monoesterified polyimide polymer partially retains, fully retains, or even increases its molecular weight.

In some embodiments, step (a) also occurs under dehydrating conditions that at least partially remove water produced during the imidization reaction of step (a).

The methods provide membranes with less than 30% by weight ester crosslinks that exhibit good permeance and selectivity. In certain embodiments, 2 to 5 mole % of the diamino monomers are bulky diamino compounds. In certain embodiments, the membrane comprises less than 10 weight % ester crosslinks, and in other embodiments essentially no ester crosslinks.

In some embodiments, the methods disclosed herein further include a step of sealing defects in the fiber by coating the fiber with polydimethylsiloxane (PDMS) or a cross-linked silicone coating.

DETAILED DESCRIPTION

Figure 1:
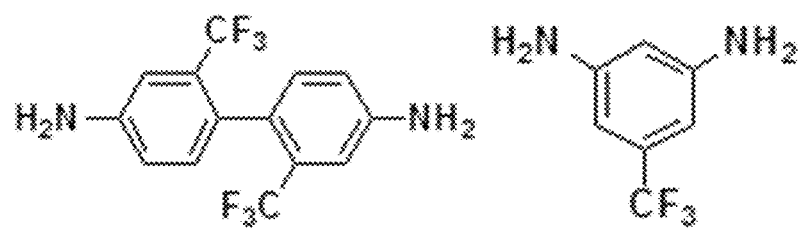
FIG. 1 illustrates exemplary bulky diamines 2,2'-bis(trifluoromethyl)benzidine (also known as 2,2'-bis(trifluoromethyl)[1,1'-biphenyl]-4,4'-diamine and 2CF3) and 5-(trifluoromethyl)-1,3-phenylenediamine; 4,4'-(9-fluorenylidene)dianiline (also known as CF3).

Disclosed herein is a novel hollow fiber polymer membrane comprising an uncrosslinked polyimide polymer containing a small amount of bulky diamine. These membranes exhibit surprising resistance to plasticization without crosslinking. Separation membranes need to exhibit a combination of selectivity and permeability. In forming the membrane, permeability cannot be reduced to a point that the membrane is unworkable and selectivity cannot be sacrificed to provide acceptable permeability.

Preferred polymers useable in the hollow fiber membrane of the present invention include polyimides, polyetherimides, polyethersulfones and polysulfones. More preferred polymers useable in the membrane material of present invention include polyimides, polyetherimides, and polysulfones made using analogs of 6FDA. Particularly preferred polyimides useable in the present invention comprise polyimides or polyetherimides made using 6FDA.

Without being bound by theory, it is believed that incorporating a small amount of bulky diamines into the high molecular weight polyimide polymer inhibits segmental motion and reduces chain mobility or flexibility. With too much segmental motion, free volume that is needed for good permeation is lost. It is also believed that the small amount of bulky diamines increases the sub-$T_g$ transition generally associated with relaxation and the loss of free volume in glassy polymers and allows for formation of a membrane that exhibits resistance to plasticization without crosslinking. In polymer membranes formed with uncrosslinked polyimide polymer not containing a small amount of bulky diamine, the membranes exhibit increased permeance and decreased selectivity with increased $CO_2$ pressure making the polyimide polymer much less suitable for membranes in comparison to the polymer as disclosed herein. Accordingly, it is surprising that the polyimide polymer containing a small amount of bulky diamine as disclosed herein exhibits good permeability and selectivity at high $CO_2$ pressure even without crosslinking.

Further disclosed herein is a method of making an uncrosslinked high molecular weight, monoesterified polyimide polymer membrane. The method advantageously omits a crosslinking step while still providing a membrane with good permeance and selectivity even at high $CO_2$ pressure. As such, the method is simplified and has an advantage of greater commercial viability.

Uncrosslinked as described herein means a polyimide polymer comprising less than 30 weight % ester crosslinks, or as stated another way, comprises greater than 70 weight % uncrosslinked esters. In some embodiments, the polyimide polymer comprises less than 20 weight % ester crosslinks (i.e., greater than 80 weight % uncrosslinked esters). In certain embodiments, the polyimide polymer comprises less than 10 weight % ester crosslinks and in specific embodiments, the polyimide polymer has essentially no ester crosslinks. Crosslinking is measured by the gel fraction method. In this method, the fiber is first weighed, and then placed into tetrahydrofuran (THF) for 24 hours at room temperature on a roller. After removal of residual THF, the fiber is again weighed. The percent weight loss is correlated to the degree of ester crosslinks. For example, a 90% weight loss indicates 10 weight % ester crosslinking and a 70% weight loss indicates 30 weight % ester crosslinking. A polyimide polymer having essentially no ester crosslinks has no measurable ester crosslinking as determined by this method and as such, exhibits approximately a 100% weight loss when tested according to this method.

The membrane comprising an uncrosslinked high molecular weight, monoesterified polyimide polymer as described herein exhibits good permeance and selectivity even at high $CO_2$ pressure. It is noted that the method of making this polyimide polymer membrane does not include an active step of subjecting the polyimide polymer to transesterification conditions to form crosslinks. As such, the high molecular weight polyimide polymer membrane and method disclosed herein are more commercially viable.

The membranes as described herein have a $CO_2$ permeance of at least 20 GPU and a $CO_2/CH_4$ selectivity of greater than 20, at 35° C. and a pressure of 100 psia. In some embodiments the membranes have a $CO_2$ permeance of at least 40 GPU and a $CO_2/CH_4$ selectivity of greater than 20, at 35° C. and a pressure of 100 psia. In certain embodiments the membranes have a $CO_2$ permeance of at least 40 GPU and a $CO_2/CH_4$ selectivity of greater than 20, at 35° C. and a pressure of 400 psia. The techniques for determining and measuring permeance and selectivity are well known to those of skill in the art. The feed for these measurements is a feed with a 50/50 $CO_2/CH_4$ mole ratio and the specified pressure for measurement is based on the total feed pressure. These techniques are taught for instance in U.S. Pat. No. 6,755,900; U.S. Pat. No. 6,932,859; U.S. Pat. No. 7,247,191; and U.S. Pat. No. 8,394,182, the contents of which are incorporated by reference in their entireties.

As used herein, the term "bulky diamine" refers to diamines of about 5 Å to about 12 Å. In certain embodiments, the bulky diamines are diamines of about 6 Å to about 12 Å. In some embodiments, the bulky diamines are diamines of about 6 Å to about 9.5 Å. The bulky diamines can also enhance the sub-$T_g$. As such, adding the bulky diamine to the polyimide polymer shifts the sub-$T_g$ peak upward by at least 2° C., compared to the same polymer without bulky diamine.

Bulky diamines include, for example, 2,2'-bis(trifluoromethyl)benzidine (also known as 2,2'-bis(trifluoromethyl)[1,1'-biphenyl]-4,4'-diamine and 2CF3); 5-(trifluoromethyl)-1,3-phenylenediamine; 4,4'-(9-fluorenylidene)dianiline (also known as CF3); 4,4'-(hexafluoroisopropylidene)dianiline (also known as Fu); and the like, and mixtures thereof. In certain embodiments, the bulky diamines are 2,2'-bis(trifluoromethyl)benzidine (2CF3), 5-(trifluoromethyl)-1,3-phenylenediamine, or 4,4'-(9-fluorenylidene)dianiline (CF3). The bulky diamines are 2 to 10 mole % of the diamino monomers used to prepare the polyimide polymer and in certain embodiments, the bulky diamines are 2 to 5 mole % of the diamino monomers used to prepare the polyimide polymer.

The bulky diamine size is measured as described as follows. The molecular structures were built by Material Studio 6.1 (Accelrys Software Inc.). Materials Studio 6.1, Accelrys, Inc.: San Diego, Calif., 2012. Their geometries were optimized using the cvff force-field implemented in the "Forcite" module. See P. Dauger-Osguthorpe, V. A. Roberts, D. J. Osguthorpe, J. Wolff, M. Genest and A. T. Hagler, Structure and energetics of ligand binding to proteins: E. colidihydrofolate reductase-trimethoprim, a drug-receptor system. Proteins: Struct., Funct., Genet. 4, 31-47 (1988). The optimized molecular structures were then exported to the CrystalMaker program (Version 8.7 for Mac OS, Crystal Maker Software Ltd.) from which physical dimensions of the molecules are determined. CrystalMaker 8.7, CrystalMaker Software Ltd, Yarnton, England, 2013. Covalent radii (from built-in database of Material Studio 6.1) of the outmost atoms are added to both the length and diameter values. The diamine size is then the distance between the axis of the two amine groups in each molecule and the dimension perpendicular to this axis, which could be measured directly by the CrystalMaker program.

By way of example, the size of 2CF3 was measured as 7.3 Å and the size of CF3 was measured as 6.8 Å.

Also as used herein the term "uncrosslinked high molecular weight, monoesterified polyimide polymer" refers to a monoesterified polyimide polymer that has an average molecular weight of between about 40,000 and about 400,000. In certain embodiments, the polyimide polymer has an average molecular weight of greater than 50,000. For example, the high molecular weight, monoesterified polyimide polymer can have an average molecular weight between about 100,000 and about 300,000.

As described herein the "uncrosslinked high molecular weight, monoesterified polyimide polymer" refers to a monoesterified polyimide polymer having less than 30 weight % ester crosslinks, or as stated another way, comprising greater than 70 weight % uncrosslinked esters. In some embodiments, the polyimide polymer comprises less than 20 weight % ester crosslinks (i.e., greater than 80 weight % uncrosslinked esters). In certain embodiments, the polyimide polymer comprises less than 10 weight % ester crosslinks and in specific embodiments, the polyimide polymer has essentially no ester crosslinks. When the polyimide polymer is described as having essentially no ester crosslinks, there is approximately 100% weight loss as determined by the gel fraction method described herein.

In one embodiment, the membrane is an uncrosslinked hollow fiber membrane. The uncrosslinked hollow fiber membrane is made utilizing the high molecular weight, monoesterified polyimide polymer including a small amount of bulky diamines. The method includes spinning monoesterified hollow fiber from the uncrosslinked monoesterified, polyimide polymer containing a small amount of bulky diamines. The method can specifically include a process for spinning monoesterified hollow fibers from a dope composition comprising the monoesterified polyimide polymer containing a small amount of bulky diamines, a volatile component, a spinning solvent, a spinning non-solvent, and optionally an inorganic additive.

The uncrosslinked high molecular weight, monoesterified polyimide polymer containing a small amount of bulky diamines as disclosed herein also can be cast to form sheets or films. The sheets or films can be cast onto a suitable support to provide a composite sheet.

Definitions

The following terms are used throughout the specification and have the following meanings unless otherwise indicated.

As used herein, the term "carboxylic acid functional group" refers to a pendant group of —COOH—.

The term "diol" refers to a chemical compound containing two hydroxyl groups.

The term "carbodiimide" means a chemical compound containing the functional group N=C=N.

The term "dianhydride" refers to any compound that contains two anhydride

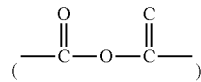

groups.

The term "halogenated alkyl" means a straight-chain or branched saturated monovalent hydrocarbon group of one to twelve carbon atoms, wherein at least one of the carbon atoms is replaced by a halogen atom (e.g. fluoromethyl, 1-bromo-ethyl, 2-chloro-pentyl, 6-iodo-hexyl, and the like).

The term "halo" or "halogenated" refers to a functional group including a halogen atom such as fluorine, chlorine, bromine, or iodine.

The term "phenyl" means an aromatic group of six carbon atoms having the formula —$C_6H_5$.

The term "alkyl" means a straight-chain or branched saturated monovalent hydrocarbon group of one to twelve carbon atoms (e.g. methyl, ethyl, i-propyl, and the like). Alkyl groups have the formula $C_nH_{2n+1}$ where n is a positive non-zero integer.

The term "diamino cyclic compound" means a chemical compound having a ring structure of three to twelve carbon atoms where the ring structure is functionalized by two amino or substituted amino groups.

The term "amino" means a functional group having the formula —NR'R" where R' and R" are independently H, alkyl, cycloalkyl, and aryl.

The term "cycloalkyl" means a cyclic saturated monovalent hydrocarbon group containing 3 to 12 carbon atoms having a single cyclic ring or multiple condensed rings. Such cycloalkyl groups include, by way of example, cyclopropyl, cyclohexyl, cyclooctyl, adamantanyl, and the like.

The term "aliphatic" refers to non-aromatic organic compounds, in which carbon atoms are joined together in straight or branched chains. Aliphatic includes paraffinic (e.g., alkyl), olefinic (e.g., alkenyl), and alkynyl compounds.

The term "antilyotropic salt" refers to a salt that interacts with solvent molecules rather than polymer molecules.

The term "amide" means a functional group having a carbonyl group (C=O) linked to a nitrogen atom or a compound that includes this functional group.

The term "ester" means a functional group having a carbonyl group (C=O) linked to an alkoxy group.

The term "alkoxy" refers to an alkyl group linked to an oxygen such as, for example, methoxy (—$OCH_3$) or ethoxy (—$OCH_2CH_3$).

The term "aryl" refers to an unsaturated aromatic carbocyclic group of from 6 to 20 carbon atoms having a single ring (e.g., phenyl) or multiple condensed (fused) rings (e.g., naphthyl or anthryl). Exemplary aryls include phenyl, naphthyl and the like.

The term "alkenyl" refers to a linear or branched unsaturated monovalent hydrocarbon group having 2 to 12 carbon atoms and containing at least one, for example, from 1 to 3 double bond(s). This term is exemplified by groups such as ethenyl (—CH=$CH_2$), 2-propenyl (—$CH_2$—CH=$CH_2$), and the like.

The term "alkynyl" refers to a linear or branched monovalent hydrocarbon group having 2 to 12 carbon atoms and containing at least one, for example, from 1 to 3 triple bond(s). This term is exemplified by groups such as ethynyl (—C≡CH), 2-propynyl (—$CH_2$—C≡CH), n-butynyl (—$CH_2$—$CH_2$—C≡CH), and the like.

As used herein, the term "reduce" means to decrease or diminish.

Whenever used herein, the term "molecular weight" or "average molecular weight" means weight average molecular weight as measured by Gel Permeation Chromatography (GPC) using polystyrene as the standard. This method is described in ASTM D5296-05.

"Draw ratio" means the ratio of the take-up rate to the extrusion rate.

The "Glass Transition Temperature" (Tg) is the temperature where the polymer transitions from hard and glassy to soft and rubbery.

The term "sub-$T_g$" refers to what is also referenced as $T_\beta$, the β-relaxation temperature at which polymer segmental motion is detected.

The term "permeability" or P refers to a pressure- and thickness-normalized flux of a given component such as $CO_2$. Permeability can be measured, for example, in Barrers.

The standard unit for measuring the permeability of gases through a supported gas separation membrane is the Barrer, which is defined as follows:

$$1 \text{ Barrer} = \frac{10^{-10} \text{ cm}^3 \ (STP) \times \text{cm}}{\text{cm}^2 \times \text{sec.} \times (\text{cm. Hg})}$$

wherein the flux (flow rate) in units of $cm^3/cm^2 \times sec.$; being volume per seconds of permeated gas at standard temperature and pressure, cm is the thickness of the film, $cm^2$ is the area of film, and cm. Hg is the pressure (or driving force).

The term "permeance" refers to the ratio of permeability to membrane thickness.

The term "selectivity" refers to the ratio of the permeabilities of two components across a membrane (i.e., $P_A/P_B$, where A and B are the two components).

The selectivity of a supported gas separation membrane in separating a two-component fluid mixture is defined as the ratio of the rate of passage of the more readily passed component to the rate of passage of the less readily passed component. Selectivity may be obtained directly by contacting a supported gas separation membrane with a known mixture of gases and analyzing the permeate. Alternatively, a first approximation of the selectivity is obtained by calculating the ratio of the rates of passage of the two components determined separately on the same gas separation membrane. Rates of passage may be expressed in Barrer units. As an example of selectivity, a $O_2/N_2$=10 indicates that the subject membrane allows oxygen gas to pass through at a rate ten times that of nitrogen.

The productivity (permeance) of a gas separation membrane is measured in GPUs which is defined as follows:

$$GPU = \frac{10^{-6} \times cm^3 \ (STP)}{cm^2 \times sec. \times (cm. \ Hg)}$$

The membranes as disclosed herein have a $CO_2$ permeance of at least 20 GPU and a $CO_2/CH_4$ selectivity of greater than 20, at 35° C. and a pressure of 100 psia. In some embodiments, the membranes have a $CO_2$ permeance of at least 40 GPU and a $CO_2/CH_4$ selectivity of greater than 20, at 35° C. and a pressure of 100 psia. In some embodiments, the membranes have a $CO_2$ permeance of at least 40 GPU and a $CO_2/CH_4$ selectivity of greater than 20, at 35° C. and a pressure of 400 psia.

Permeability, permeance, and selectivity are measured by techniques well known to those of skill in the art, as described for example in U.S. Pat. No. 7,247,191, the contents of which are incorporated by reference in their entirety. As described herein, permeance and selectivity are measured at 35° C. and a pressure of 100 psia. The feed for these measurements is a feed with a 50/50 $CO_2/CH_4$ mole ratio and the specified pressure for measurement is based on the total feed pressure.

It is noted that while permeance and selectivity are measured at 35° C. and a pressure of 100 psia as the standard for comparison herein, permeance and selectivity can also be measured at higher pressures, such as 200 psia or 400 psia. If permeance and selectivity are measured at 200 psia or 400 psia, then these measurements would be expected to demonstrate poorer performance than when measured at 100 psia. Accordingly, if the standards for permeance and selectivity are met when measuring at a pressure of 200 psia or 400 psia, then the standards for permeance and selectivity would be expected to be met measuring at a pressure of 100 psia. For example, if the membranes exhibit good permeance and selectivity when measured at 35° C. and a pressure of 200 psia, then the membranes would be expected to also exhibit good permeance and selectivity when measured at 35° C. and a pressure of 100 psia.

The term "PDMC" refers to propane diol monoester polymer. One form of PDMC having a 3:2 DAM:DABA ratio has the structure:

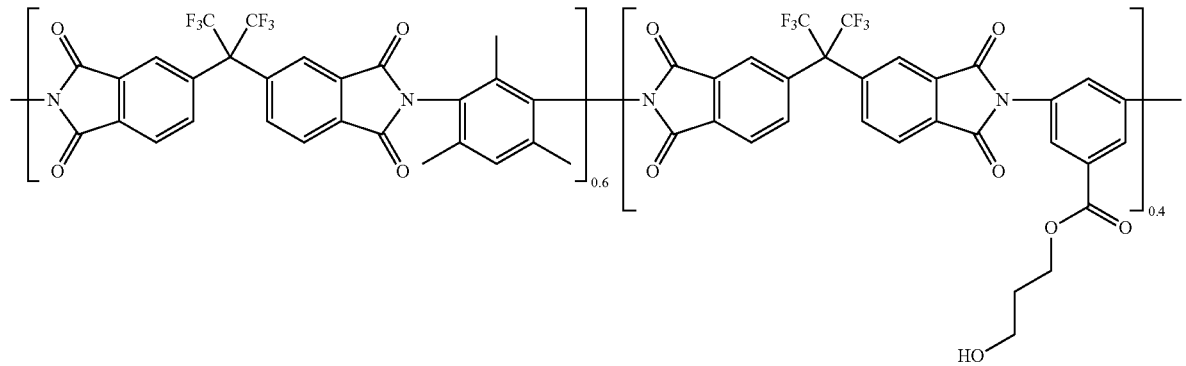

Methods of Making Membranes of Uncrosslinked Monoesterified Polyimide Polymer with Small Amount of Bulky Diamine The method of making an uncrosslinked monoesterified polyimide polymer as described herein comprises the following steps: (a) preparing a polyimide polymer comprising carboxylic acid functional groups from a reaction solution comprising monomers and at least one solvent, wherein the monomers comprise dianhydride monomers, diamino monomers without carboxylic acid functional groups, and diamino monomers with carboxylic acid functional groups and wherein 2 to 10 mole % of the diamino monomers are replaced with bulky diamino compounds; and (b) treating the polyimide polymer with a diol at esterification conditions in the presence of dehydrating conditions to form an uncrosslinked monoesterified polyimide polymer, wherein the dehydrating conditions at least partially remove water produced during step (b). A membrane comprising the uncrosslinked monoesterified polyimide polymer is then obtained from this monoesterified polyimide polymer, wherein the membrane comprises less than 30% by weight ester crosslinks.

In some embodiments, the membrane comprising the uncrosslinked monoesterified polyimide polymer incorporating a small amount of bulky diamines may contain defects in the skin. These defects can be sealed by coating the hollow fiber with polydimethylsiloxane (PDMS) or a crosslinked silicone coating. In these embodiments, the method may further comprise the step of sealing the monoesterified polyimide polymer with polydimethylsiloxane (PDMS) or a cross-linked silicone coating. The sealing step may include dip-coating with a layer of polydimethylsiloxane or a cross-linked silicone coating which serves to plug any defects which may have formed in the process. This is a conventional method for sealing defects. This post-treating process is described in U.S. Pat. No. 8,337,598, which is incorporated by reference in its entirety.

Polymerization Reaction and Imidization Reaction

In step (a), the monomers polymerize in a polymerization reaction to provide a polyamide polymer comprising amide bonds. An imidization reaction takes place whereby the amide bonds form imide bonds to provide a polyimide polymer. The monomers comprise dianhydride monomers, diamino monomers without carboxylic acid functional groups, and diamino monomers with carboxylic acid functional groups. Of the diamino monomers, 2 to 10 mole % are bulky diamino compounds. In certain embodiments, 2 to 5 mole % of the diamino monomers are bulky diamino compounds. The small amount of bulky diamine allows for formation of a high molecular weight polyimide polymer.

Step (a) involves preparing a polyimide polymer comprising carboxylic acid functional groups from a reaction solution comprising monomers and at least one solvent. The monomers and at least one solvent are combined such that the monomers dissolve in the solvent to form the reaction solution. Thereafter, the monomers polymerize through the formation of amide bonds to provide a polyamide polymer. The polyamide polymer is then subjected to imidization conditions whereby the amide bonds are converted to imide rings to provide a polyimide polymer.

The monomers comprise dianhydride monomers, diamino monomers without carboxylic acid functional groups, and diamino monomers with carboxylic acid functional groups. Of the diamino monomers, 2 to 10 mole % are bulky diamino compounds. In certain embodiments, 2 to 5 mole % of the diamino monomers are bulky diamino compounds.

The imidization reaction of step (a) can take place under dehydrating conditions. Water is produced as a by-product during the imidization reaction. Such dehydrating conditions at least partially remove this water by-product from the reaction solution. It is desirable to remove water in step (a) because water produced during the imidization reaction can degrade the imide rings of the polyimide polymer during the subsequent monoesterification reaction. This residual imidization water can also cause chain scissioning of the polyimide polymer as the water produced during the monoesterification reaction. While the polyimide polymer could be precipitated out of the reaction solution as in conventional processes and then subjected to monoesterification, including dehydrating conditions in step (a) makes such a precipitation step unnecessary and the entire reaction can be a "one-pot" synthesis.

Monomers

The monomers can comprise between about 15 and about 25 weight percent of the reaction solution. The monomers comprise dianhydride monomers, diamino monomers without carboxylic acid functional groups, and diamino monomers with carboxylic acid functional groups. Of the diamino monomers, about 2 to about 10 mole % are bulky diamino compounds. In one embodiment, about 2 to about 5 mole % of the diamino monomers are bulky diamino compounds.

As described herein, at least some of the monomers include carboxylic acid functional groups such that the resultant polyimide polymer comprises carboxylic acid functional groups. The diamino monomers can include diamino cyclic compounds and diamino aromatics. As described herein, of the diamino monomers, about 2 to about 10 mole % are bulky diamino compounds.

For example, the monomers can include dianhydride monomers A, diamino monomers without carboxylic acid functional groups B, and diamino monomers with carboxylic acid functional groups C; wherein 2 to 10 mole % of the diamino monomers B and C are bulky diamino compounds D.

The dianhydride monomers A can be a dianhydride of formula (I):

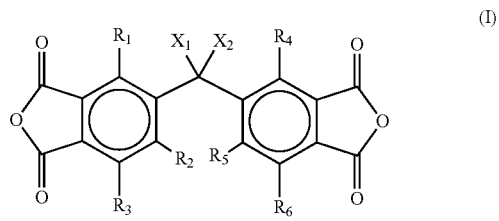

(I)

wherein $X_1$ and $X_2$ are independently halogenated alkyl, phenyl or halogen; and $R_1$, $R_2$, $R_3$, $R_4$, $R_5$, and $R_6$ are independently H, alkyl, or halogen.

If the monomers are comprised of the monomers A, B, and C, the ratio of B to C can be between 1:4 and 8:1. In certain embodiments, the ratio of B to C is approximately 3:2. Of the monomers B and C, about 2 to about 10 mole % of the diamino monomers B and C are bulky diamino compounds D and in certain embodiments about 2 to about 5 mole % of the diamino monomers B and C are bulky diamino compounds D.

The monomer A can be 4,4'-(hexafluoroisopropylidene) diphthalic anhydride (6FDA), which is also known as (2,2-bis(3,4-dicarboxyphenyl) hexafluoropropane. 6FDA has the following formula:

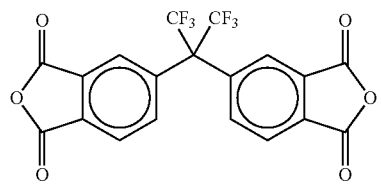

Including 6FDA in the monomers provides stability to the polyimide polymer because 6FDA has limited rotational ability.

Monomers with limited rotational ability, like 6FDA, are desirable because they increase the selectivity of the membrane made according to the method disclosed herein. Monomers with bulky side groups, like $(CF_3)_2$ in 6 FDA, also inhibit chain packing, which increases permeance of molecules through the membrane. Both selectivity and permeance are important for efficient and productive separations. Further reference to these structure property relationships can be found in Koros and Fleming, *Journal of Membrane Science*, 83, 1-80 (1993), herein incorporated by reference in its entirety.

The monomer B, a diamino cyclic compound without a carboxylic acid functionality, can be a diamino aromatic compound with more than one aromatic ring where the amino groups are on the same or different aromatic ring. For example, the monomer B can be 4,4' isopropylidene dianiline, 3,3' hexafluoroisopropylidene dianiline, 4,4' hexafluoroisopropyliene dianiline, 4,4' oxydianiline, 3,3' oxydianiline, 4,4' diaminodiphenyl, diaminotoluene, diaminobenzotrifluoride, dimethyldiaminobenzene, trimethyldiaminobenezene, or tetramethyldiaminobenzene. The monomer B can also be 2,4,6-trimethyl-m-phenylenediamine (DAM), which is represented by the following formula:

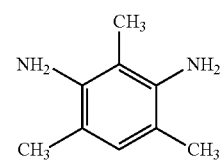

The monomer C, a diamino cyclic compound with a carboxylic acid functionality, can be diamino benzoic acid. It is represented by the following formula:

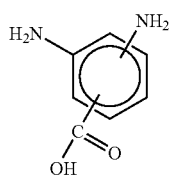

More specifically, the monomer C can be 3,5 diaminobenzoic acid (DABA).

The bulky diamino compounds D are diamines of about 5 Å to about 12 Å. In some embodiments, the bulky diamines are diamines of about 6 Å to about 12 Å, and in certain embodiments, the bulky diamines are diamines of about 6 Å to about 9.5 Å. Bulky diamino compounds D include, for example, 2,2'-bis(trifluoromethyl)benzidine (also known as 2,2'-bis(trifluoromethyl)[1,1'-biphenyl]-4,4'-diamine and 2CF3); 5-(trifluoromethyl)-1,3-phenylenediamine; 4,4'-(9-fluorenylidene)dianiline (also known as CF3); 4,4'-(hexafluoroisopropylidene)dianiline (also known as Fu); and the like, and mixtures thereof. In certain embodiments, the bulky diamines are 2,2'-bis(trifluoromethyl)benzidine (2CF3), 5-(trifluoromethyl)-1,3-phenylenediamine, 4,4'-(9-fluorenylidene)dianiline (CF3), or mixtures thereof. FIG. 1 illustrates exemplary bulky diamines 2CF3 and CF3.

The bulky diamines are 2 to 10 mole % of the diamino monomers used to prepare the polyimide polymer and in certain embodiments, the bulky diamines are 2 to 5 mole % of the diamino monomers used to prepare the polyimide polymer.

In one embodiment of the method as described herein, the monomers include A, B, C, and D, where A is 6FDA, B is DAM, C is DABA and D is 2,2'-bis(trifluoromethyl)benzidine (2CF3), 5-(trifluoromethyl)-1,3-phenylenediamine, or 4,4'-(9-fluorenylidene)dianiline (CF3). In this embodiment, the 6FDA content of the monomer mixture is about 50 weight percent and the remaining about 50 weight percent of the monomer mixture is composed of DAM, DABA, and 2CF3, 5-(trifluoromethyl)-1,3-phenylenediamine or CF3. As described above, 2 to 10 mole % of the DAM and DABA monomer mixture is composed of the bulky diamino compound D (2CF3, 5-(trifluoromethyl)-1,3-phenylenediamine or CF3).

In one example, the 6FDA content of the monomer mixture can be about 50 weight percent and the remaining about 50 weight percent can be about 35-40 mole percent DABA, about 55-60 mole percent DAM, and about 2-5 mole percent 2CF3, 5-(trifluoromethyl)-1,3-phenylenediamine or CF3.

Whichever monomers are used, according to some embodiments of the method as described herein, they can be purified prior to step (a). The monomers can be purified by techniques known in the art, for example, sublimation or recrystallization.

Solvents

The monomers are dissolved in at least one solvent to create a reaction solution and facilitate polymerization. The resulting polyamide polymer remains in the reaction solution for imidization. The at least one solvent can comprise between about 75 and about 95 weight percent of the reaction solution. The at least one solvent can be at least one high boiling organic solvent. The solvent can also be mixtures of organic solvents. Exemplary high boiling organic solvents are listed in Table 1 along with their normal boiling points.

TABLE 1

| High boiling organic solvent | Normal boiling point (° C.) |
|---|---|
| N-Methyl-2-pyrrolidione (NMP) | 202.1 |
| Dimethyl sulfoxide (DMSO) | 190 |
| Dimethylformamide (DMF) | 152.9 |
| Dimethylacetamide (DMAc) | 165.1 |
| Diglyme | 162 |

Accordingly, the solvent of the reaction solution can be any one of the organic solvents listed above or mixtures thereof. High boiling solvents are desirable because they prevent excessive evaporation, which would significantly alter concentrations in the reaction solution and concentrations during subsequent processing.

Dehydrating Conditions

If dehydrating conditions are utilized during step (a) to remove water, the concentration of water in the reaction solution can be maintained at between about 0 weight percent and about 0.26 weight percent.

The dehydrating conditions can be the presence of a chemical dehydrating agent and/or a mechanical dehydrating agent. The dehydrating conditions can be the presence of a chemical dehydrating agent only, a mechanical dehydrating agent only, or the combination of a chemical dehydrating agent and a mechanical dehydrating agent.

If a chemical dehydrating agent is utilized, the chemical dehydrating agent does not impede the imidization reaction of step (a). For example, it does not decrease the imidization reaction rate or decrease the monoesterified, polyimide polymer yield.

Polymerization Conditions

In the polymerization reaction of step (a), monomers polymerize in the reaction solution to form a polyamide polymer containing a small amount of bulky diamine. Polymerization can occur at room temperature while the reaction solution is stirred or otherwise agitated. Solvent concentration during polymerization is between about 75 and about 95 weight percent of the reaction solution.

Imidization Conditions

In the imidization reaction of step (a), the amide bonds of the polyamide polymer form imide rings to provide the polyimide polymer. The imidization reaction in step (a) occurs over an extended period of time, approximately 12-36 hours. Such an extended period of time ensures that the imidization reaction proceeds to completion, which is important with respect to yield of the polyimide polymer. The imidization reaction can occur at temperatures between about 160° C. and about 200° C. Solvent concentration during imidization is between about 75 and about 95 weight percent of the reaction solution.

The polyimide polymer incorporates a small amount of bulky diamine, has a high molecular weight, and can readily be esterified.

Monoesterification Reaction

Step (b) involves treating the polyimide polymer with a diol at esterification conditions in the presence of the dehydrating conditions to form a monoesterified polyimide polymer. As such, in step (b), the polyimide polymer is monoesterified to provide the monoesterified polyimide polymer. More specifically, the carboxylic acid functional groups (—COOH) of the polyimide polymer react with the hydroxyl functional groups (—OH) of the diol to convert the —COOH groups to esters. This provides a monoesterified polyimide polymer and water as a by-product. Each diol molecule contains two —OH groups. During monoesterification, only one of the —OH groups of each diol molecule reacts with a —COOH group. Ideally, the conversion of —COOH groups to esters (i.e. the ester yield) is almost 100%. However, in some cases, the ester yield can be less than 100%.

In step (b), dehydrating conditions at least partially remove the water by-product such that the average molecular weight of the monoesterified polyimide polymer is partially maintained, fully maintained, or even increased.

Step (b) can further comprise treating the polyimide polymer with the diol in the presence of an acid catalyst to facilitate the monoesterification reaction. When the acid catalyst is present in an amount less than that typically used in conventional monoesterification reactions without water removal, the monoesterified polyimide polymer partially retains, fully retains, or even increases its molecular weight.

In some embodiments, step (a) also occurs under dehydrating conditions that at least partially remove water produced during the imidization reaction of step (a).

After the imidization reaction of step (a) is complete, the reaction solution comprises the polyimide polymer, the at least one solvent, and any unreacted monomers. The diol can be directly added to the reaction solution to form a monoesterification reaction solution. Thus, both the imidization reaction of step (a) and the monoesterification reaction of step (b) can take place in one reaction vessel or "one pot." Alternatively, the polyimide polymer can be isolated and then combined with the diol to form a monoesterification reaction solution such that the imidization reaction of step (a) and the monoesterification reaction of step (b) take place in separate reaction vessels.

Importantly, in the method as described herein, at least a portion of the water produced as a by-product is removed from the monoesterification reaction solution by the dehydrating conditions.

Diol

In the present method, the length of the diol is an important consideration. If the diol is too long or too short, it can decrease the permeance and/or selectivity of a membrane formed from the monoesterified, polyimide polymer.

Diols useful in the method as described herein include ethylene glycol, propylene glycol, 1,3 propanediol, 1,4 butanediol, 1,2 butanediol, benzenedimethanol, 1,3 butanediol, and mixtures thereof. In one embodiment of the method as described herein, the diol is selected from the group consisting of ethylene glycol, propylene glycol, 1,3 propanediol, benzenedimethanol, and mixtures thereof. In another embodiment, the diol is selected from the group consisting of ethylene glycol, propylene glycol, 1,3 propanediol, and mixtures thereof. In yet another embodiment, the diol is selected from the group consisting of ethylene glycol, 1,3 propanediol, and mixtures thereof. In still another embodiment, the diol is 1,3 propanediol.

Dehydrating Conditions

As with the optional dehydrating conditions of step (a), the dehydrating conditions of step (b) can result from a chemical dehydrating agent and/or a mechanical dehydrating agent. Therefore, the dehydrating conditions can be a chemical dehydrating agent alone, a mechanical dehydrating agent alone, or the combination of a chemical dehydrating agent and a mechanical dehydrating agent. It is desirable that the dehydrating conditions, whether chemical or mechanical, remove water produced during step (b) from the monoesterification reaction solution such that the concentration of water in the monoesterification reaction solution is maintained at between about 0 weight percent and about 0.08 weight percent.

If a chemical dehydrating agent is utilized, the chemical dehydrating agent does not impede the monoesterification reaction of step (b). For example, it does not decrease the monoesterification reaction rate or decrease the monoesterified, polyimide polymer yield. The chemical dehydrating agent can be an azeotropic chemical dehydrating agent or can be a carbodiimide.

A carbodiimide functions as a chemical dehydrating agent by participating in the monoesterification reaction by activating the carboxylic acid functionality of the polyimide polymer toward ester formation and thereby eliminating the water by-product at the same time. If a carbodiimide is used as the chemical dehydrating agent, it can be used in an amount between about 1 and about 4 times the stoichiometric amount based on the moles of water removed.

An azeotropic chemical dehydrating agent forms an azeotrope with the water by-product, which can be boiled out of the monoesterification reaction solution. Such azeotropic chemical dehydrating agents are well known to those of ordinary skill in the art and include ODCB, benzene, toluene, and mixtures thereof. If an azeotropic chemical dehydrating agent is used as the chemical dehydrating agent, it can be used in relatively large amounts, for example, between about 1 ml to about 4 ml per gram polyimide polymer. Such a large amount of azeotropic chemical dehydrating agent ensures that the water produced by the monoesterification reaction is removed from the monoesterification reaction solution.

The chemical dehydrating agent can also be periodically added to the monoesterification reaction solution throughout step (b). For example, ODCB can be added periodically. According to one embodiment of the method as described herein, the chemical dehydrating agent is added to the monoesterification reaction solution in three separate batches.

As in step (a), the mechanical dehydrating agent is a physical system designed to remove water. An exemplary mechanical dehydrating agent is a Dean-Stark trap. Dean-Stark traps are well known to those of ordinary skill in the art. Any mechanical system that prevents water distilled from the monoesterification reaction solution from returning to the monoesterification reaction solution is suitable.

If dehydrating conditions are utilized in step (a), the dehydrating conditions of step (b) can be the same as the dehydrating conditions of step (a). In fact, it is desirable for the dehydrating conditions to be the same because this simplifies the overall method as described herein. In conventional polymerization/imidization/monoesterification reaction methods, the polyimide polymer is precipitated out of the reaction solution. However, this extra precipitation step is eliminated when the same dehydrating conditions are utilized during monoesterification. Further, dehydrating conditions remaining from the imidization reaction of step (a) can be employed in the monoesterification reaction of step (b).

Acid Catalyst

Acid catalysts useful in monoesterification reactions are well known to those of skill in the art. Acid catalysts activate the carboxyl functional groups of the polyimide polymer so that they will react with the hydroxyl groups of the diol. Acid catalysts replace acid chlorides as carboxyl functional group activators. The use of acid chlorides as carboxyl functional group activators is set forth in Example 1 of U.S. Pat. No. 6,755,900, which is incorporated by reference in its entirety herein. Exemplary acid catalysts include para-toluene sulfonic acid, sulfuric acid, methanesulfonic acid, triflic acid, and mixtures thereof. If the dehydrating conditions utilized include a carbodiimide, acid catalyst may not be necessary because the carboxyl functional group of the polyimide polymer is activated by the carbodiimide.

The amount of acid catalyst present during the monoesterification reaction, under dehydrating conditions, also affects the average molecular weight of the monoesterified, polyimide polymer. More particularly, when the amount of acid catalyst used is less than the conventional amount and dehydrating conditions are present, significantly less molecular weight loss, no molecular weight loss, or even molecular weight gain, occurs. While not wishing to be bound by any particular theory, it is believed that excess acid catalyst augments degradation of the imide rings of the polyimide polymer, which causes undesirable chain scissioning and loss of average molecular weight. If DABA monomers are used in the method as described herein, the amount of acid catalyst can be further reduced from the conventional amount. This is due to the fact that DABA monomers are intrinsically acidic.

Between about 0 milligrams and about 2.5 milligrams of acid catalyst can be added to the monoesterification reaction solution per gram of the polyimide polymer without experiencing undesirable molecular weight loss. In other embodiments less than 5.0 milligrams of acid catalyst can be added to the monoesterification reaction solution per gram of the polyimide polymer without experiencing undesirable molecular weight loss.

Monoesterification Conditions

The monoesterification reaction solution, with or without catalyst, is heated to a relatively high temperature over an extended period of time. Generally, the monoesterification reaction solution is heated for approximately 12-30 hours at a temperature between about 120° C. and about 140° C.

In small (volume) scale reactions, the dehydrating conditions can remove water more easily than in large (volume) scale reactions because the surface area to volume ratio of the reaction vessel is higher. Such a higher ratio facilitates boiling of the water.

In large (volume) scale reactions, it is advantageous for both the imidization reaction of step (a) and the monoesterification reaction of step (b) to occur in the same reaction vessel. Then any dehydrating conditions remaining from the imidization reaction can easily be utilized during the monoesterification reaction.

Membrane Comprising Uncrosslinked Polyimide Polymer

The monoesterified polyimide polymer with small amounts of bulky diamine maintains a relatively high average molecular weight and is mechanically strong, flexible, and can be easily and rapidly spun. The small amount of bulky diamine allows for formation of a high molecular weight polyimide polymer. Even without crosslinking, the fiber membrane made with a small amount of bulky diamine exhibits good permeance and selectivity even at high $CO_2$ pressure. As such, the polyimide polymer with small amounts of bulky diamine is suitable for separation membranes even without crosslinking. It is believed the small amount of bulky diamine minimizes segmental motion and as such, increases sub-$T_g$. The membranes comprising uncrosslinked polyimide polymer with small amounts of bulky diamine exhibit surprising resistance to plasticization without crosslinking.

The monoesterified polyimide polymer produced by step (b) can have an average molecular weight between about 40,000 and about 400,000. In some embodiments, the monoesterified polyimide polymer has an average molecular weight of at least 50,000. In one embodiment, the monoesterified polyimide polymer has an average molecular weight between about 100,000 and about 300,000. In one embodiment, the monoesterified polyimide polymer has an average molecular weight between about 100,000 and about 300,000. The weight average molecular weight as described herein is measured using Gel Permeation Chromatography (GPC). The monoesterified polyimide polymer can also have a polydispersity index between about 2 and about 4.

The method of making a polymer membrane as described herein does not include an active step of subjecting the monoesterified polyimide polymer to transesterification conditions to form a crosslinked membrane. The polymer membrane as disclosed herein comprises the uncrosslinked monoesterified polyimide polymer with small amount of bulky diamines, wherein the membrane comprises less than 30% by weight ester crosslinks. In some embodiments, the membrane comprises less than 20% by weight ester crosslinks or less than 10% by weight ester crosslinks. In certain embodiments, the membrane comprises essentially no ester crosslinks.

In one embodiment, the uncrosslinked membrane is an uncrosslinked hollow fiber membrane. The uncrosslinked hollow fiber membrane is made by a method comprising spinning uncrosslinked monoesterified hollow fiber from the uncrosslinked monoesterified polyimide polymer.

In some embodiments, the monoesterified polyimide polymer incorporating a small amount of bulky diamines may not be spun into defect-free hollow fiber and may contain defects in the skin of the fiber. These defects can be sealed by coating the hollow fiber with polydimethylsiloxane (PDMS) or a cross-linked silicone coating. Accordingly, the methods as described herein may include optionally dip-coating with a layer of polydimethylsiloxane or a cross-linked silicone coating which serves to plug any defects which may have formed in the process. This is a conventional method for sealing defects. In these embodiments, the methods further comprise the step of sealing defects by coating the hollow fiber with polydimethylsiloxane (PDMS) or a cross-linked silicone coating.

The membranes made from the uncrosslinked high molecular weight, monoesterified polyimide polymer containing a small amount of bulky diamine may take any form known in the art, for example, hollow fibers, tubular shapes, and other membrane shapes. Other membrane shapes include spiral wound membranes, pleated membranes, flat sheet membranes, and polygonal membranes. The uncrosslinked high molecular weight, monoesterified polyimide polymer containing a small amount of bulky diamine as disclosed herein can also be cast to form sheets or films. The sheets or films can be cast onto a suitable support to provide a composite sheet. The sheets and films can be cast onto a sheet of another polymer. This polymer support can be a porous and low cost polymer. As such, this porous polymer can be used as a support for a less porous sheet or film formed from the uncrosslinked high molecular weight, monoesterified polyimide polymer containing a small amount of bulky diamine as disclosed herein.

In the method for forming uncrosslinked hollow fiber membranes, uncrosslinked monoesterified hollow fiber is spun from the uncrosslinked monoesterified polyimide polymer. The monoesterified polyimide polymer can be spun into monoesterified hollow fibers at high take-up rates. To make such monoesterified hollow fiber, the monoesterified polyimide polymer can be incorporated into a spinning dope, which is spun into monoesterified hollow fiber by means of a spinning process such as a wet-quench/dry-jet spinning process. While a wet-quench/dry-jet spinning process is discussed in detail below, it should be appreciated that other types of spinning methods (e.g. wet spinning) can be used to form the monoesterified hollow fiber.

Because the uncrosslinked monoesterified polyimide polymer includes a small amount of bulky diamines, the uncrosslinked monoesterified hollow fiber formed from such polymer exhibits good selectivity and permeance even at high $CO_2$ pressure. The uncrosslinked membrane exhibits good selectivity for separating $CO_2$ and $CH_4$ even at high pressure. For example, hollow fiber spun from PDMC containing 5 mol % CF3 can exhibit, at 35° C. and 100 psia, pure-gas selectivity ($CO_2/CH_4$) between about 25 and about 65 or between about 25 and about 50. It is noted that for fibers with minor defects, a post-treatment with PDMS is utilized. For defect-free fibers, post-treating is not required to get to a selectivity of 25 or greater.

In summary, the uncrosslinked hollow fiber membrane exhibits the same or similar selectivity and permeance even at high $CO_2$ pressure as crosslinked hollow fiber membranes made from monoesterified polyimide polymers with bulky diamines and significantly better selectivity and permeance stability with increased $CO_2$ pressure as uncrosslinked hollow fiber membranes made from monoesterified polyimide polymers without bulky diamines.

Spinning Dope to Form Monoesterified Hollow Fiber

The spinning dope is a homogeneous one phase solution and can comprise the uncrosslinked monoesterified polyimide polymer, a volatile component, an optional inorganic additive, a spinning solvent, and a spinning non-solvent.

Polymer concentration is a matter of concern. Sufficient polymer must be present to form strong fibers and membranes capable of withstanding high pressures. However, too much polymer increases resistance in the membrane substructure and adversely affects membrane performance. In one embodiment of the method as described herein, the monoesterified polyimide polymer is present in the spinning dope in an amount between about 20 and about 50 weight percent. In another embodiment, the monoesterified polyimide polymer is present in the spinning dope in an amount between about 25 and about 45 weight percent. In yet another embodiment, the monoesterified polyimide polymer is present in the spinning dope in an amount between about 30 and about 40 weight percent.

The volatile component can be an organic solvent with a specified room temperature vapor pressure and a specified boiling point. Such an organic solvent aids in the formation of the dense skin separation layer of the hollow fiber. It effectively and efficiently evaporates during the dry jet step of the wet-quench/dry-jet spinning process and evaporation on the outside of the nascent fiber is believed to help keep the polymer chains more entangled and at a higher concentration, which promotes vitrification and formation of the dense skin. The specified room temperature vapor pressure of the organic solvent can be greater than about 0.05 bar. Alternatively, the specified room temperature vapor pressure can be greater than about 0.1 bar. As another alternative, the specified room temperature vapor pressure can be greater than about 0.2 bar. The specified boiling point of the organic solvent can be between about 30° C. and about 100° C. Alternatively, the specified boiling point can be between about 40° C. and about 90° C. As another alternative, the specified boiling point can be between about 50° C. and about 70° C.

Exemplary organic solvents include tetrahydrofuran (THF) and acetone. In one embodiment of the method as described herein, the volatile component is present in the spinning dope in an amount between about 5 and about 25 weight percent. In another embodiment, the volatile component is present in the spinning dope in an amount between about 5 and about 20 weight percent. In yet another embodiment, the volatile component is present in the spinning dope in an amount between about 10 and about 15 weight percent.

The optional inorganic additive can enhance phase separation, increase substructure porosity, and increase viscosity of the spinning dope. Since the uncrosslinked monoesterified, polyimide polymer has a large quantity of carboxyl functional groups, it is more hydrophilic than most traditional polymers used in spinning processes. Therefore, it takes a longer time for the monoesterified polyimide polymer to separate during the wet-quench step. The optional inorganic additive reduces the time necessary for phase separation of the monoesterified polyimide polymer.

The optional inorganic additive can be an antilyotropic salt. As defined herein, the term "antilyotropic salt" refers to a salt that interacts with solvent molecules rather than polymer molecules. See Ekiner O. M. et al., *Journal of Membrane Science* 53 (1990) 259-273. Exemplary antilyotropic salts include $LiNO_3$, $LiClO_4$, $MgCl_2$, $ZnCl_2$, and NaI Concentration of the inorganic additive is also a matter of concern. While the inorganic additive can reduce the time required for phase separation, it is believed that excess inorganic additive (e.g. $LiNO_3$) can cause defect formation if the porosity extends into the non-vitrified skin layer of the hollow fiber. In one embodiment of the method as described herein, the concentration of antilyotropic salt in the spinning dope is between about 0 and about 10 weight percent. In another embodiment, the concentration of the antilyotropic salt in the spinning dope is between about 2 and about 8 weight percent. In yet another embodiment, the concentration of the antilyotropic salt in the spinning dope is between about 4 and about 7 weight percent.

The spinning solvent can be a high boiling organic solvent. Exemplary high boiling organic solvents are listed in Table 1 above, along with their normal boiling points. A high boiling organic solvent that has a high affinity for water can enhance phase separation of the hollow fiber in the wet-quench step of the spinning process. NMP is a particularly desirable spinning solvent because it dissolves many polymers used in spinning, is relatively benign compared to other spinning solvents, and has a high affinity for water. The concentration of the spinning solvent can be dependent upon many factors, including the molecular weight of the monoesterified polyimide polymer, the polydispersity index of the monoesterified polyimide polymer, and the other components of the spinning dope, and can be determined by the precipitation method discussed below. The concentration of the spinning solvent can be, for example, between about 25 and about 35 weight percent.

The spinning non-solvent can be an alcohol, such as an aliphatic alcohol, or water. In one embodiment of the method as described herein, the spinning non-solvent is a lower boiling aliphatic alcohol, for example, methanol or ethanol. The normal boiling points of methanol and ethanol are 64.7° C. and 78.4° C., respectively. Some spinning non-solvents (e.g. ethanol) can also serve as an additional volatile component. The concentration of the spinning non-solvent is directly dependent upon the spinning solvent concentration and can also be determined by the precipitation method discussed below. The concentration of the spinning non-solvent can be, for example, between about 15 and about 25 weight percent.

The concentrations of spinning solvent and spinning non-solvent can be determined by an iterative precipitation method wherein the concentrations of the spinning solvent and the spinning non-solvent are dependent upon the respective concentrations of the monoesterified polyimide polymer, the volatile component, and the optional inorganic additive. Such precipitation method ensures that the spinning dope is a homogeneous one-phase solution, but is still close to the point of precipitation to reduce the phase separation time during the wet-quench step.

According to the precipitation method, the concentrations of the uncrosslinked monoesterified polyimide polymer, the volatile component, and the optional inorganic additive are set. Initial concentrations of the spinning solvent and the spinning non-solvent are then chosen. The components, in these concentrations, are combined in a small sample vial. First, the volatile component, the spinning solvent, and the spinning non-solvent are mixed to form a solution. Next, the optional inorganic additive is added to the solution. After the optional inorganic additive dissolves in the solution, the monoesterified polyimide polymer is added to the solution to provide a spinning dope sample. The polymer can be added in batches to facilitate dispersion of the polymer throughout the solution. If the polymer precipitates out, the spinning solvent concentration is increased anywhere between about 0 weight percent and about 5 weight percent to arrive at the final spinning solvent concentration. The spinning non-solvent concentration is similarly decreased to arrive at the final spinning non-solvent concentration. If the polymer does not precipitate out, the concentration of the spinning solvent and/or the spinning non-solvent is altered and the precipitation test is repeated. Iterations occur until final concentrations are obtained that provide a homogeneous one-phase spinning dope close to the point of precipitation.

A larger amount of spinning dope can be prepared according to these final concentrations. It is advantageous to carry out the precipitation method with small sample amounts of spinning dope before spinning any batch of the spinning dope because the point of precipitation can vary as the structure and/or average molecular weight of the polymer varies.

Dry-Jet/Wet-Quench Spinning Process to Form Monoesterified Hollow Fiber

If a dry-jet/wet-quench spinning process is used to spin the uncrosslinked high molecular weight, monoesterified polyimide polymer into hollow fibers, several benefits can be realized. First, the hollow fibers can be spun at higher take-up rates. Second, the dry jet step can increase chain entanglement, which hypothetically forms skin on the hollow fibers. Third, the high molecular weight polymer can increase dope viscosity, which allows the spinning dope to be spun at elevated dope temperatures. Such elevated dope temperatures are required for evaporative skin formation.

Dry-jet/wet-quench spinning processes are well known in the art. Generally, in a dry-jet/wet-quench spinning process, spinning dope comprising a polymer is extruded into filaments through orifices of a spinneret, which is separated from a coagulating bath by a gaseous layer or non-coagulating liquid. The filaments are passed through the gaseous layer, such as air, or non-coagulating liquid, such as toluene or heptane, and then conducted into a coagulating bath. Conveyance of the filaments through the gaseous layer is commonly referred to as the dry jet step. The coagulating bath can be an either an aqueous system, such as pure water, or a non-aqueous system, such as methanol. Conveyance of the filaments through the coagulating bath is commonly referred to as the wet-quench step. After the filaments leave the coagulating bath, they can be washed. Washing is especially important if the coagulating bath contains any acid and can be accomplished with water alone or combinations of alkaline solutions and water. The filaments are dried and wound on a rotating drum. They can be air dried on the drum or the drum can be heated to facilitate drying.

According to an embodiment of the method of making the uncrosslinked hollow fiber membrane as described herein, a monoesterified polyimide polymer is extruded through orifices of a spinneret to provide a hollow fiber. This hollow fiber is conveyed through a gaseous layer of air and through a coagulating bath of de-ionized water. The fibers exit the de-ionized water bath and are wound around a take-up drum. The take-up drum can be partially contained in a vessel of room temperature de-ionized water in order to keep the fiber wet. The fiber can be left on the take-up drum for between about 10 minutes and about 20 minutes and then cut into strands and left in another de-ionized water bath for between about 2 days and about 3 days. The de-ionized water baths help remove solvent from the fiber. The fibers can then be dehydrated by fluid exchange with non-solvents of decreasing surface tension, for example, ethanol and hexane. Ultimately, the fibers can be air-dried and/or oven-dried.

According to the method as described herein, the spinneret orifices can have smaller dimensions than those used in conventional spinning processes. Smaller spinneret dimensions permit spinning of hollow fibers under normal conditions into fibers useful for making membranes that can be used under high pressure conditions (i.e. fibers with a diameter of less than 300 microns). The smaller spinneret dimensions also improve mixing in the spinneret and shearing during extrusion. Further, the smaller spinneret dimensions increase the extrusion velocity and consequently decrease the draw ratio (i.e. the take-up rate divided by the extrusion rate). Reduced draw ratios are desirable because excessively high draw ratios can induce high orientation/elongation stresses, which may be detrimental during further processing.

The annular diameter of the spinneret orifices can be approximately half the size of conventional spinneret orifices. For example, the annular diameter can be between about 600 microns and about 1300 microns and the bore needle outer diameter can be between about 300 microns and about 700 microns.

The draw ratio can be less than 150. Alternatively, the draw ratio can be less than 100. As another alternative, the draw ratio can be less than 50. As still another alternative, the draw ratio can be less than 10.

The distance between the point of extrusion out of the spinneret and the surface of the de-ionized water bath is referred to herein as the "air gap height." The air gap height must be greater than 0 cm. The air gap height can be between about 1 cm and about 5 cm. Alternatively, the air gap height can be between about 1 cm and about 10 cm. As another alternative, the air gap height can be between about 1 cm and about 20 cm. Larger air gap heights favor skin formation.

Similarly, relatively high spinning dope temperatures (i.e. the temperature of the spinning dope just before extrusion through the spinneret) favor skin formation. The spinning dope temperature can be greater than 40° C. Alternatively, the spinning dope temperature can be greater than 50° C. As yet another alternative, the spinning dope temperature can be greater than 60° C.

As stated above, according to one embodiment, the coagulating bath contains de-ionized water. A sufficiently high coagulating bath temperature ensures adequate phase separation in the coagulating bath. If phase separation is inadequate, the fibers will be crushed in the first guide roll after extrusion. The coagulating bath temperature can be between about 10° C. and about 70° C. Alternatively, the coagulating bath temperature can be between about 25° C.

and about 60° C. As another alternative, the coagulating bath temperature can be between about 40° C. and about 50° C.

The take-up rate (i.e. the speed at which the hollow fibers are wound around the take-up drum) can be much greater than take-up rates used when spinning low molecular weight polymers. This is due to the fact that the high molecular weight polymers as described herein can withstand the greater stresses associated with higher take-up rates. The take-up rate can be increased with a fixed extrusion rate if a smaller diameter fiber is required. Take-up rates between about 20 m/min and about 150 m/min (e.g. between about 20 m/min and about 70 m/min) are achievable according to the method as described herein.

The face velocity of air surrounding the spinneret can be greater than 50 ft/min. Alternatively, the face velocity of air surrounding the spinneret can be greater than 80 ft/min. As another alternative, the face velocity of air surrounding the spinneret can be greater than 100 ft/min.

Method of Using the Membranes

A mixture containing gases to be separated can be enriched by passing the gas mixture through the membrane as disclosed herein. Such gas mixture to be enriched can originate from a hydrocarbon well such as an oil or gas well including an offshore well. It is also possible to enrich a mixture of liquids to be separated by passing the liquid mixture through the membrane as disclosed herein.

For example, the membrane comprising uncrosslinked polyimide polymer can be used to separate gases by:

(a) providing a feed stream selected from the group consisting of air, a mixture of methane and nitrogen, a mixture of methane and hydrogen, a mixture of methane and hydrogen sulfide, a refinery stream, a mixture of carbon dioxide and methane, and syngas, the feed stream including a gaseous component selected from the group consisting of nitrogen, oxygen, hydrogen, hydrogen sulfide and carbon dioxide;

(b) maintaining a pressure differential between an upstream side of the membrane and a downstream side of the membrane;

(c) contacting the upstream side of the membrane with the feed stream at a pressure between about 20 psia and about 4000 psia;

(d) isolating a permeate stream on the downstream side of the membrane having a larger mole fraction of the faster permeating component of the feed stream; and (e) isolating a retentate stream having a smaller mole fraction of the faster permeating component of the feed stream.

The feed stream can be enriched in the gaseous component at a temperature between about 25° C. and 200° C. In one embodiment, the feed stream is measured at a temperature of 35° C. The feed stream can be at a pressure from about 50 psia to about 4000 psia. As another alternative, the feed stream can be at a pressure from about 100 psia to about 1000 psia or from about 100 psia to about 200 psia. In one embodiment, the feed stream is measured at a pressure of 100 psia or 200 psia. The temperature of the feed stream can be its temperature as produced from a hydrocarbon well (e.g. an oil or gas well including an offshore well). These conditions can be varied using routine experimentation depending on the feed streams. The downstream side of the membrane can be maintained as a vacuum.

A variety of gas mixtures can be purified with the membrane as disclosed herein. For example, applications include enrichment of air by nitrogen and oxygen, carbon dioxide removal from methane streams, hydrogen sulfide removal from methane streams, nitrogen or hydrogen removal from methane streams, or carbon monoxide from syngas streams. The membrane can also be used in hydrogen separation from refinery streams and other process streams, for example from the dehydrogenation reaction effluent in the catalytic dehydrogenation of paraffins. Generally, this membrane may be used in any separation process with gas mixtures involving, for example, hydrogen, nitrogen, methane, hydrogen sulfide, carbon dioxide, carbon monoxide, helium, and oxygen.

If additional purification is required, the product in the permeate stream can be passed through additional membranes, and/or the product can be purified via distillation using techniques well known to those of skill in the art. Typically, membrane systems may consist of many modules connected in various configurations. See, for example, Prasad et al., *J. Membrane Sci.*, 94, 225-248 (1994), the contents of which are incorporated by reference herein in their entirety for background and review. Modules connected in series offer many design possibilities to purify the feed, permeate, and residue streams to increase the separation purity of the streams and to optimize the membrane system performance.

Membranes as disclosed herein can be used in separation systems like those discussed in U.S. Pat. Nos. 6,932,859 and 7,247,191, which are incorporated herein by reference in their entirety.

The membranes made from the uncrosslinked high molecular weight, monoesterified polyimide polymer may take any form known in the art, for example, hollow fibers, tubular shapes, and other membrane shapes. Other membrane shapes include spiral wound membranes, pleated membranes, flat sheet membranes, and polygonal membranes.

Hollow fibers as described herein can be employed in bundled arrays potted at either end to form tube sheets and fitted into a pressure vessel thereby isolating the insides of the tubes from the outsides of the tubes.

The following examples are provided as specific illustrations, and are not meant to be limiting.

Example 1

Vacuum dried monomers (16.62 grams DAM, 12.24 grams DABA, and 1.77 grams CF3 diamine) were dissolved in 60 wt % NMP. To this was added 89.37 grams of 6FDA dianhydride dissolved in 40 wt % NMP, to give a molar ratio of: 5.5 6FDA-DAM:0.5 6FDA-CF3:4 6FDA-DABA.

This mixture was allowed to polycondense for 24 hours under a nitrogen purge at room temperature to give a polyamide polymer.

Example 2

To the polyamide in NMP of Example 1 was added 21.0 ml of β-picoline as a catalyst along with 186.3 ml of acetic anhydride. The polymer was allowed to imidize for 24 hours under a nitrogen purge at room temperature to give a polyimide polymer. The polyimide was methanol washed and filtered. It was then dried at room temperature for eight hours and then at 210° C. for 24 hours.

Example 3

60 grams of the polyimide polymer from Example 2 and 390 grams of NMP were mixed and heated to about 100° C. 150 ml of toluene was added as a dehydrating agent, and the mixture heated to about 130° C. Then 0.3 grams of p-toluenesulfonic acid (p-TSA) were added as a catalyst. Then 202 ml of 1,3-propanediol were slowly added, and the polymer allowed to esterify under a nitrogen purge at about 130° C. for 24 hours. The mixture was then cooled to around 50° C. and the polymer precipitated in 50/50 vol % methanol/water. The monoesterified polymer was then washed with methanol/water, filtered, and dried for 12 hours at room temperature and 24 hours at 70° C.

Example 4

A spinning dope containing 32 wt % of the monoesterified polymer of Example 3, 32 wt % NMP, 15.8 wt % ethanol as the spinning non-solvent, 13.7 wt % THF as the volatile component, and 6.5 wt % $LiNO_3$ as a viscosity enhancing salt, was prepared.

Example 5

A second monoesterified polymer was prepared similar to that of Examples 1-3. A spinning dope containing 30.5 wt % of the monoesterified polymer, 33.5 wt % NMP, 19.5 wt % ethanol as the spinning non-solvent, 10.0 wt % THF as the volatile component, and 6.5 wt % $LiNO_3$ as a viscosity enhancing salt, was prepared.

Example 6

The spinning dope of Example 4 was used to spin hollow fibers at a spinning temperature of 50° C., a water bath temperature of 50° C., an air gap of 1 cm, and a take-up rate of 40 m/min, with a bore solution of 80% NMP and 20% water.

Example 7

The spinning dope of Example 4 was used to spin hollow fibers at the same conditions as in Example 6, but an air gap of 5 cm.

Example 8

The spinning dope of Example 5 was used to spin hollow fibers at a spinning temperature of 70° C., a water bath temperature of 50° C., an air gap of 3 cm, and a take-up rate of 60 m/min, with a bore solution of 85% NMP and 15% water.

Example 9

The spinning dope of Example 5 was used to spin hollow fibers at a spinning temperature of 50° C., a water bath temperature of 50° C., an air gap of 5 cm, and a take-up rate of 40 m/min, with a bore solution of 85% NMP and 15% water.

Example 10

The fibers of Example 6 were tested with a mixed gas of 50/50 vol % $CO_2/CH_4$ at 200 psi and 35° C., with shell side feed. The $CO_2$ permeance was about 115 GPU with a $CO_2/CH_4$ selectivity of 22.

Example 11

The fibers of Example 7 were tested with a mixed gas of 50/50 vol % $CO_2/CH_4$ at 200 psi and 35° C., with shell side feed. The $CO_2$ permeance was about 95 GPU with a $CO_2/CH_4$ selectivity of 28.

Example 12

The fibers of Example 6 were coated for 30 minutes with a 2 wt % solution of polydimethylsiloxane (PDMS), then vacuum dried for two hours at 200° C. These fibers were tested at the same conditions as in Example 10. The $CO_2$ permeance was about 100 GPU with a $CO_2/CH_4$ selectivity of 41.

Example 13

The fibers of Example 7 were coated for 30 minutes with a 2 wt % solution of polydimethylsiloxane (PDMS), then vacuum dried for two hours at 200° C. These fibers were tested at the same conditions as in Example 11. The $CO_2$ permeance was about 90 GPU with a $CO_2/CH_4$ selectivity of 43.

Comparative Example 14

Figure 2:
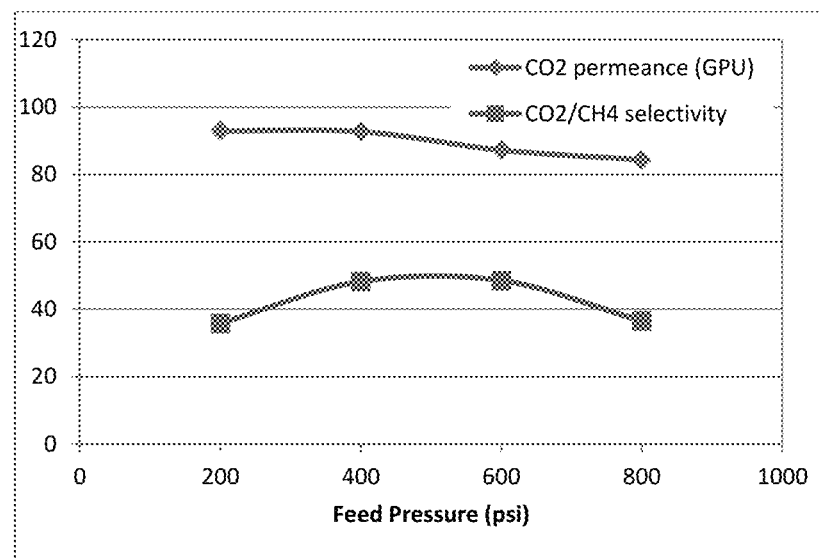
FIG. 2 shows the $CO_2$ permeance and $CO_2/CH_4$ selectivity for the fibers of Comparative Example 14 when tested with a 50/50 vol % $CO_2/CH_4$ mixed gas at 35° C. with shell side feed at pressures between 200 and 800 psi.

The fibers of Example 7 were crosslinked at 200° C. under vacuum, and then coated for 30 minutes with a 2 wt % solution of polydimethylsiloxane (PDMS), then vacuum dried for two hours at 200° C. These fibers were then tested with a 50/50 vol % $CO_2/CH_4$ mixed gas at 35° C. with shell side feed at pressures between 200 and 800 psi. FIG. 2 shows that the $CO_2$ permeance stayed in the range of about 82-92 GPU, with $CO_2/CH_4$ selectivity in the range 38-48.

Comparative Example 15

The fibers of Example 6 were crosslinked at 200° C. under vacuum, and then tested with a mixed gas of 50/50 vol % $CO_2/CH_4$ at 200 psi and 35° C. with shell side feed. The $CO_2$ permeance was about 110 GPU with a $CO_2/CH_4$ selectivity of 23, showing a CO2 permeance loss of only 4-8%.

Example 16

Figure 3:
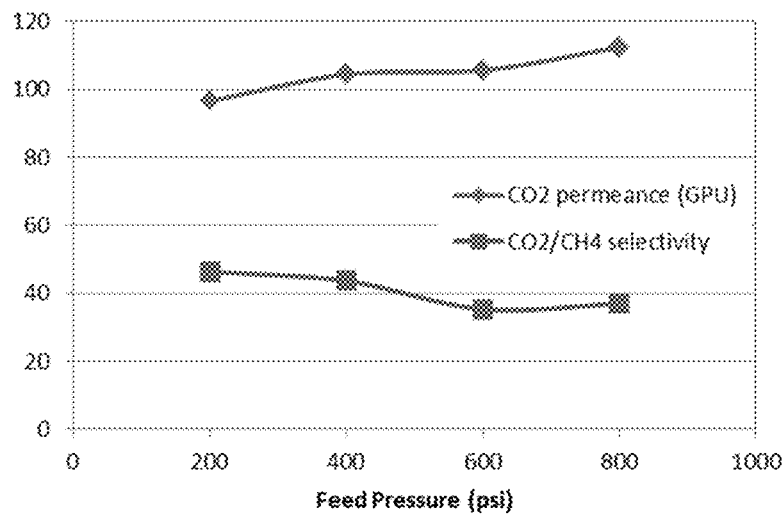
FIG. 3 shows the $CO_2$ permeance and $CO_2/CH_4$ selectivity for the fibers of Example 13 when tested with a 50/50 vol % $CO_2/CH_4$ mixed gas at 35° C. with shell side feed at pressures between 200 and 800 psi for as described in Example 16.
Figure 4:
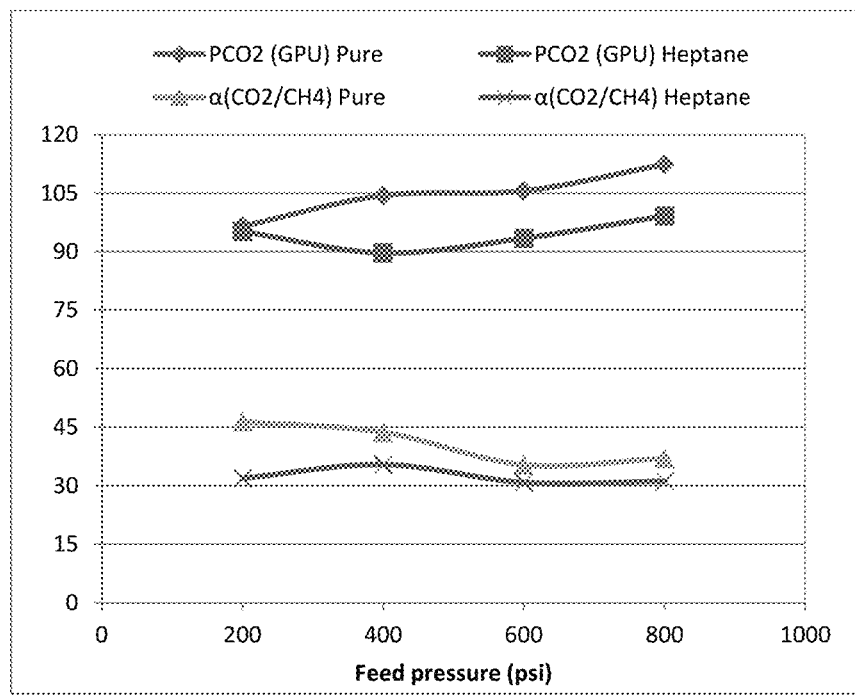
FIG. 4 shows the $CO_2$ permeance and $CO_2/CH_4$ selectivity for the fibers of Example 13 when tested with 50/50 vol % $CO_2/CH_4$ mixed gas at 35° C., but containing 300 ppm heptane to show stability to hydrocarbon impurities as described in Example 16.

The fibers of Example 13 were tested with a 50/50 vol % $CO_2/CH_4$ mixed gas at 35° C. with shell side feed at pressures between 200 and 800 psi. FIG. 3 shows that the CO2 permeance stayed in the range of about 100-115 GPU, with $CO_2/CH_4$ selectivity in the range 38-42, showing surprising resistance to plasticization without crosslinking. The fibers of Example 13 were also tested using the same 50/50 vol % $CO_2/CH_4$ mixed gas at 35° C., but containing 300 ppm heptane to show stability to hydrocarbon impurities. FIG. 4 shows the $CO_2$ permeance and $CO_2/CH_4$ selectivity with these feeds.

Comparative Example 17

Figure 5:
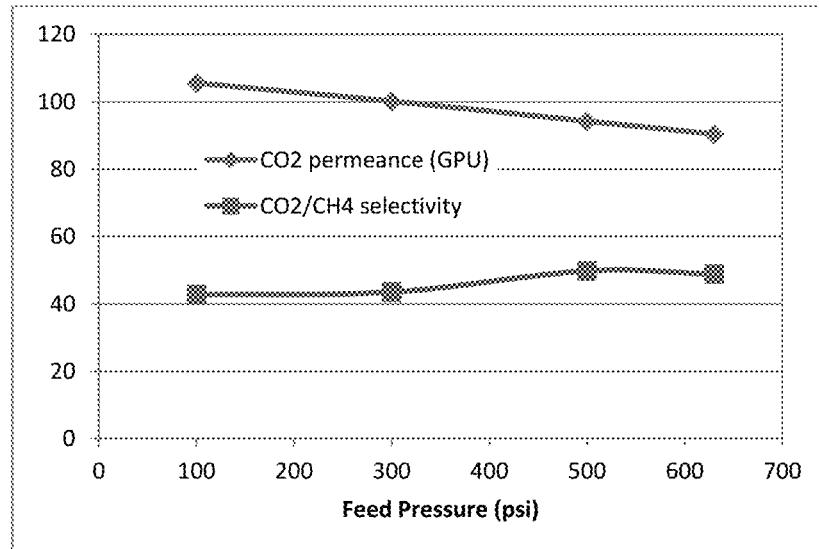
FIG. 5 shows the $CO_2$ permeance and $CO_2/CH_4$ for fibers when tested with a 50/50 vol % $CO_2/CH_4$ mixed gas at 35° C. with shell side feed at pressures between 200 and 800 psi as described in Comparative Example 17.

The fibers of Comparative Example 15 were coated with PDMS and dried in the same way as the fibers in Example 13, then tested with a 50/50 vol % $CO_2/CH_4$ mixed gas at 35° C. with shell side feed at pressures between 200 and 800 psi. FIG. 5 shows that the $CO_2$ permeance stayed in the range of about 92-105 GPU, with $CO_2/CH_4$ selectivity in the range 41-50.

Example 18

The fibers of Example 8 were tested with a mixed gas of 50/50 vol % $CO_2/CH_4$ at 200 psi and 35° C. with shell side feed. The $CO_2$ permeance was about 58 GPU with a $CO_2/CH_4$ selectivity of 32.

Example 19

The fibers of Example 9 were tested with a mixed gas of 50/50 vol % $CO_2/CH_4$ at 200 psi and 35° C. with shell side feed. The $CO_2$ permeance was about 62 GPU with a $CO_2/CH_4$ selectivity of 38.

Comparative Example 20

The fibers of Example 8 were crosslinked at 200° C. under vacuum, and then tested with a mixed gas of 50/50 vol % $CO_2/CH_4$ at 200 psi and 35° C. with shell side feed. The $CO_2$ permeance was about 60 GPU with a $CO_2/CH_4$ selectivity of 35, showing no CO2 permeance loss.

Comparative Example 21

The fibers of Example 9 were crosslinked at 200° C. under vacuum, and then tested with a mixed gas of 50/50 vol % $CO_2/CH_4$ at 200 psi and 35° C. with shell side feed. The $CO_2$ permeance was about 61 GPU with a $CO_2/CH_4$ selectivity of 34, showing a CO2 permeance loss of less than 4%.

Example 22

Figure 6:
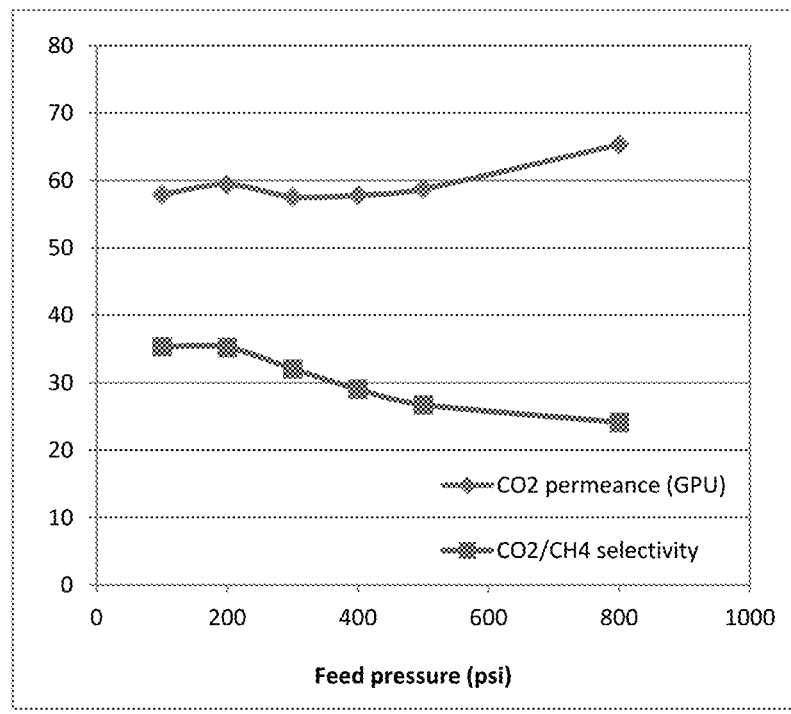
FIG. 6 shows the $CO_2$ permeance and $CO_2/CH_4$ selectivity for the fibers of Example 8 when tested with a 50/50 vol % $CO_2/CH_4$ mixed gas at 35° C. with shell side feed at pressures between 200 and 800 psi as described in Example 22.

The uncrosslinked fibers of Example 8 were tested with a 50/50 vol % $CO_2/CH_4$ mixed gas at 35° C. with shell side feed at pressures between 200 and 800 psi. FIG. 6 shows that the $CO_2$ permeance went up only slightly at 800 psi, and that $CO_2/CH_4$ selectivity stayed above 28 up to 600 psi, dropping only to 24 at 800 psi.

Comparative Example 23

Figure 7:
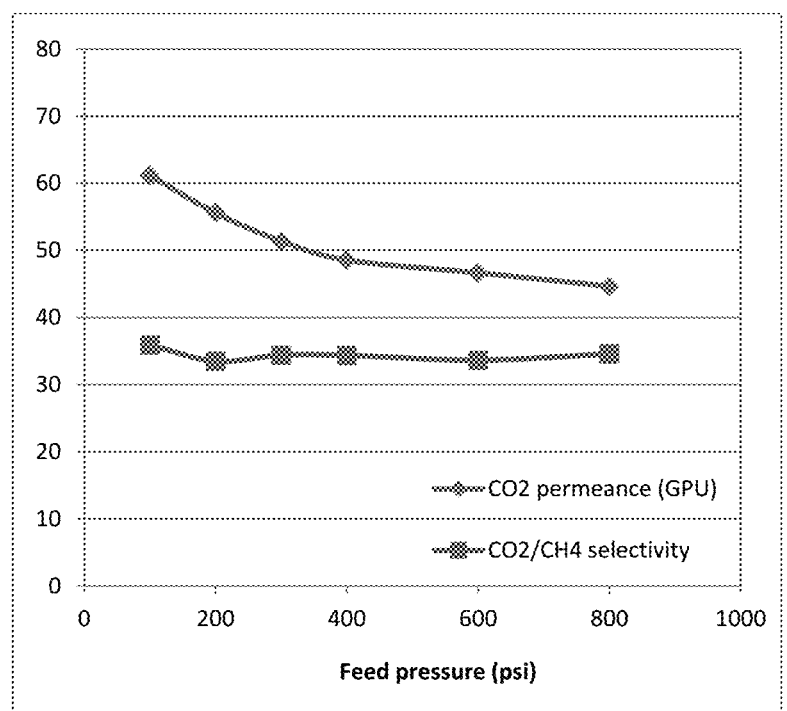
FIG. 7 shows the $CO_2$ permeance and $CO_2/CH_4$ selectivity for the fibers of Comparative Example 20 when tested with a 50/50 vol % $CO_2/CH_4$ mixed gas at 35° C. and shell side feed at pressures between 200 and 800 psi as described in Comparative Example 23.

The crosslinked fibers of Comparative Example 20 were tested with a 50/50 vol % $CO_2/CH_4$ mixed gas at 35° C. and shell side feed at pressures between 200 and 800 psi. FIG. 7 shows that the $CO_2/CH_4$ selectivity stayed in the range 33-37.

Comparative Example 24

Hollow fibers were made as described herein using 6FDA, DAM, and DABA with a 3:2 6FDA-DAM: 6FDA-DABA ratio.

Figure 8:
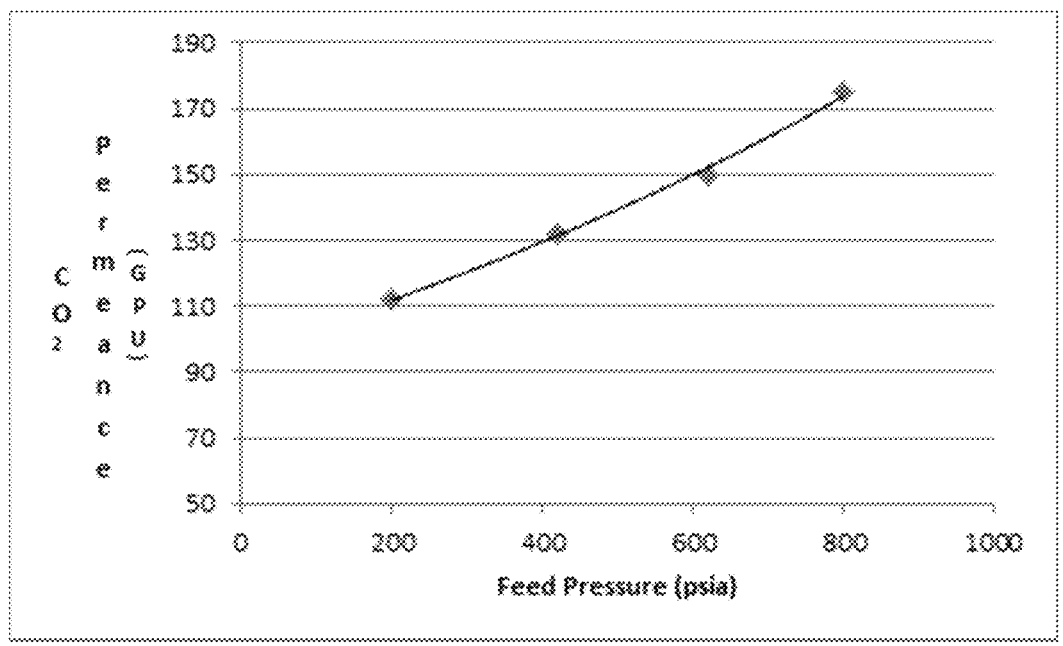
FIG. 8 shows $CO_2$ permeance for the fibers of Comparative Example 24 when tested with a 50/50 vol % $CO_2/CH_4$ mixed gas at 35° C. with shell side feed at pressures between 200 and 800 psi.
Figure 9:
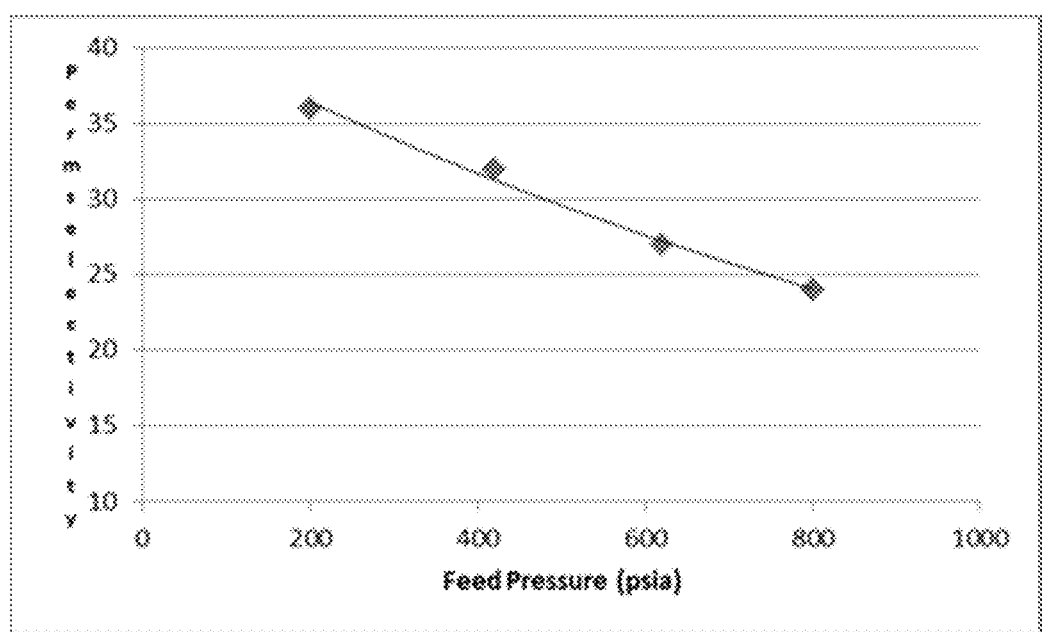
FIG. 9 shows $CO_2/CH_4$ selectivity for the fibers of Comparative Example 24 when tested with a 50/50 vol % $CO_2/CH_4$ mixed gas at 35° C. with shell side feed at pressures between 200 and 800 psi.

The fibers were tested with a 50/50 vol % $CO_2/CH_4$ mixed gas at 35° C. with shell side feed at pressures between 200 and 800 psi. FIG. 8 shows $CO_2$ permeance increased significantly as pressure increased up to 800 psi. FIG. 9 shows that $CO_2/CH_4$ selectivity decreased significantly as pressure increased up to 800 psi.

As shown in FIGS. 8 and 9, in polymer membranes formed with uncrosslinked polyimide polymer not containing a small amount of bulky diamine, the membranes exhibit increased permeance and decreased selectivity making the polyimide polymer much less suitable for membranes in comparison to the polymer as disclosed herein.

Although the methods as described herein have been described in connection with certain embodiments thereof, it will be appreciated by those skilled in the art that additions, deletions, modifications, and substitutions not specifically described may be made without departing from the spirit and scope of the methods as defined in the appended claims.

What is claimed is:

1. A method of making a membrane comprising an uncrosslinked high molecular weight, monoesterified polyimide, the method comprising:
   (a) preparing a polyimide comprising carboxylic acid functional groups from a reaction solution comprising monomers and at least one solvent, wherein the monomers comprise (i) a dianhydride monomer, (ii) a diamino monomer without carboxylic acid functional groups, (iii) a diamino monomer with carboxylic acid functional groups, and (iv) a bulky diamino compound different from the diamino monomers (ii) and (iii), wherein 2 to 10 mole % of the total diamino monomers comprise the bulky diamine compound;
   (b) treating the polyimide with a diol at esterification conditions in the presence of dehydrating conditions to form an uncrosslinked monoesterified polyimide, wherein the dehydrating conditions at least partially remove water produced during step (b); and
   (c) obtaining a membrane comprising the uncrosslinked monoesterified polyimide polymer comprising less than 30% by weight ester crosslinks.

2. The method of claim 1, wherein the membrane obtained in step (c) comprises less than 20% by weight ester crosslinks.

3. The method of claim 1, wherein the membrane obtained in step (c) comprises less than 10% by weight ester crosslinks.

4. The method of claim 1, wherein the membrane obtained in step (c) comprises essentially no ester crosslinks.

5. The method of claim 1, wherein the monomers comprise:
   (a) a dianhydride monomer A of formula (I):

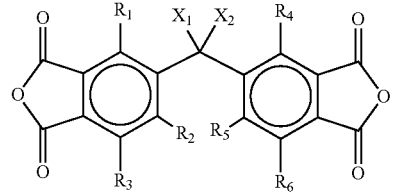

where $X_1$ and $X_2$ are independently halogenated alkyl, phenyl or halogen; and
$R_1$, $R_2$, $R_3$, $R_4$, $R_5$, and $R_6$ are independently H, alkyl, or halogen;
   (b) a diamino monomer without carboxylic acid functional groups B;
   (c) a diamino monomer with carboxylic acid functional groups C; and
   (d) a bulky diamino compound D different from diamino monomers B and C;
wherein 2 to 10 mole % of the total diamino monomers comprise the bulky diamino compound D.

6. The method of claim 5, wherein A is 4,4'-(hexafluoroisopropylidene) diphthalic anhydride (6FDA), B is 2,4,6-trimethyl-m-phenylenediamine (DAM), and C is 3,5-diaminobenzoic acid (DABA).

7. The method of claim 6, wherein the bulky diamino compound D comprises 2,2'-bis(trifluoromethyl)benzidine (2CF3), 5-(trifluoromethyl)-1,3-phenylenediamine, 4,4'-(9-fluorenylidene)dianiline (CF3), or mixtures thereof.

8. The method of claim 7, wherein 2 to 5 mole % of the total diamino monomers comprise the bulky diamino compound D.

9. The method of claim 1, wherein the monoesterified polyimide has an average molecular weight of 100,000 to 300,000 as measured by Gel Permeation Chromatography.

10. The method of claim 1, wherein the membrane of step (c) exhibits a $CO_2$ permeance of at least 20 GPU and a $CO_2/CH_4$ selectivity of greater than 20, measured at 35° C. and a pressure of 100 psia.

11. The method of claim 1, wherein the membrane of step (c) exhibits a $CO_2$ permeance of at least 40 GPU and a $CO_2/CH_4$ selectivity of greater than 20, measured at 35° C. and a pressure of 100 psia.

12. The method of claim 1, wherein the membrane of step (c) exhibits a $CO_2$ permeance of at least 40 GPU and a $CO_2/CH_4$ selectivity of greater than 20, measured at 35° C. and a pressure of 400 psia.

13. The method of claim 1, wherein the membrane is an uncrosslinked hollow fiber membrane and the method further comprises spinning monoesterified hollow fiber from the monoesterified polyimide.

14. The method of claim 13, wherein the spinning is from a spinning dope comprising the monoesterified polyimide, a volatile component, a spinning solvent, a spinning non-solvent, and optionally an inorganic additive.

15. The method of claim 14, wherein the monoesterified polyimide is present in the spinning dope in an amount between about 20 and about 50 weight percent.

16. The method of claim 15, wherein the volatile component is present in the spinning dope in an amount between about 5 and about 25 weight percent.

17. The method of claim 1, wherein (i) the dianhydride monomer comprises 4,4'-(hexafluoroisopropylidene) diphthalic anhydride (6FDA), (ii) the diamino monomer without carboxylic acid functional groups comprises 2,4,6-trimethyl-m-phenylenediamine (DAM), (iii) the diamino monomer with carboxylic acid functional groups comprises 3,5-diaminobenzoic acid (DABA), and (iv) the bulky diamino compound comprises 2,2'-bis(trifluoromethyl)benzidine (2CF3), 5-(trifluoromethyl)-1,3-phenylenediamine, or 4,4'-(9-fluorenylidene)dianiline (CF3).

18. The method of claim 17, wherein the monoesterified polyimide has an average molecular weight of 100,000 to 300,000 as measured by Gel Permeation Chromatography.

19. The method of claim 18, wherein 2 to 5 mole % of the total diamino monomers comprise a bulky diamino compound D.

20. The method of claim 1, further comprising coating the membrane comprising uncrosslinked monoesterified polyimide with polydimethylsiloxane.

21. A hollow fiber polymer membrane comprising a polyimide membrane material made from a polyimide having an average molecular weight of at least 50,000 and including the monomers A+B+C+D wherein:

A is a dianhydride of the formula:

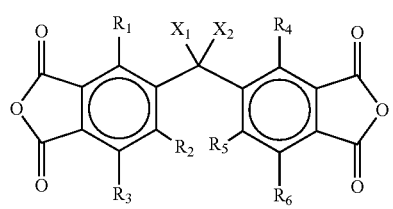

where $X_1$ and $X_2$ are the same or different halogenated alkyl group, phenyl or halogen; and where $R_1$, $R_2$, $R_3$, $R_4$, $R_5$, and $R_6$ are H, alkyl, or halogen;

B is a diamino cyclic compound without a carboxylic acid functionality;

C is a diamino cyclic compound with a carboxylic acid functionality; and

D is a bulky diamino compound which is different from diamino cyclic compounds B and C; and wherein the polyimide membrane material comprises less than 30% by weight ester crosslinks.

22. The membrane of claim 21, wherein the polyimide membrane material comprises less than 20% by weight ester crosslinks.

23. The membrane of claim 21, wherein the polyimide membrane material comprises less than 10% by weight ester crosslinks.

24. The membrane of claim 21, wherein the polyimide membrane material comprises essentially no ester crosslinks.

25. The membrane of claim 21, wherein A is 4,4'-(hexafluoroisopropylidene) diphthalic anhydride (6FDA), B is 2,4,6-trimethyl-m-phenylenediamine (DAM), and C is 3,5-diaminobenzoic acid (DABA).

26. The membrane of claim 21, wherein the bulky diamino compound D comprises 2,2'-bis(trifluoromethyl)benzidine (2CF3), 5-(trifluoromethyl)-1,3-phenylenediamine, 4,4'-(9-fluorenylidene)dianiline (CF3), or mixtures thereof.

27. The membrane of claim 21, wherein the polyimide has an average molecular weight of 100,000 to 300,000 as measured by Gel Permeation Chromatography.

28. The membrane of claim 21, wherein 2 to 5 mole % of the total diamino monomers comprise the bulky diamino compound D.

29. The membrane of claim 21, wherein the dianhydride monomer A comprises 4,4'-(hexafluoroisopropylidene) diphthalic anhydride (6FDA), the diamino monomer without carboxylic acid functional groups B comprise 2,4,6-trimethyl-m-phenylenediamine (DAM), the diamino monomer with carboxylic acid functional groups C comprise 3,5-diaminobenzoic acid (DABA), and the bulky diamino compound D comprises 2,2'-bis(trifluoromethyl)benzidine (2CF3), 5-(trifluoromethyl)-1,3-phenylenediamine, or 4,4'-(9-fluorenylidene)dianiline (CF3).

30. The membrane of claim 29, wherein 2 to 5 mole % of the total diamino monomers comprise the bulky diamino compound D.

31. The membrane of claim 21, wherein the membrane exhibits a $CO_2$ permeance of at least 20 GPU and a $CO_2/CH_4$ selectivity of greater than 20, measured at 35° C. and a pressure of 100 psia.

32. The membrane of claim 21, wherein the membrane exhibits a $CO_2$ permeance of at least 40 GPU and a $CO_2/CH_4$ selectivity of greater than 20, measured at 35° C. and a pressure of 100 psia.

33. The membrane of claim 21, wherein the membrane exhibits a $CO_2$ permeance of at least 40 GPU and a $CO_2/CH_4$ selectivity of greater than 20, measured at 35° C. and a pressure of 400 psia.

\* \* \* \* \*